United States Patent [19]

Suzuki et al.

[11] Patent Number: 5,182,776
[45] Date of Patent: Jan. 26, 1993

[54] IMAGE PROCESSING APPARATUS HAVING APPARATUS FOR CORRECTING THE IMAGE PROCESSING

[75] Inventors: Masato Suzuki, Ibaraki; Hiromi Inaba, Katsuta; Hiroshi Takenaga, Ibaraki; Masachika Yamazaki, Katsuta; Naoto Oonuma, Hitachi; Kiyoshi Nakamura, Katsuta; Yoshio Sakai, Ibaraki; Kenji Yoneda, Katsuta; Naofumi Nakata, Katsuta; Syoji Kasai, Katsuta, all of Japan

[73] Assignee: Hitachi, Ltd., Chiyoda, Japan

[21] Appl. No.: 664,319

[22] Filed: Mar. 4, 1991

[30] Foreign Application Priority Data

Mar. 2, 1990 [JP] Japan .................. 2-049311
Mar. 14, 1990 [JP] Japan .................. 2-061287

[51] Int. Cl.$^5$ ............................. G06K 9/62
[52] U.S. Cl. ........................... 382/14; 382/1; 382/48; 358/108; 187/132
[58] Field of Search .............. 382/14, 15, 34, 34, 382/41, 48, 51; 364/222; 358/108, 93; 187/132, 139; 340/825.28, 825.31

[56] References Cited

U.S. PATENT DOCUMENTS

| | | | |
|---|---|---|---|
| 4,679,032 | 7/1987 | Roschier | 382/1 |
| 4,742,549 | 5/1988 | Roschier | 382/1 |
| 4,748,675 | 5/1988 | Suzuki et al. | 382/14 |
| 4,937,878 | 6/1990 | Lo et al. | 382/48 |
| 4,951,786 | 8/1990 | Haraguchi | 358/108 |
| 4,975,970 | 12/1990 | Zetter et al. | 382/51 |
| 5,003,490 | 3/1991 | Castelaz et al. | 382/15 |
| 5,054,093 | 10/1991 | Cooper et al. | 382/14 |

FOREIGN PATENT DOCUMENTS 1-241667 9/1989 Japan .
1459678 3/1974 United Kingdom .
2230622 3/1990 United Kingdom .

OTHER PUBLICATIONS

Translations "Traffic Flow Measurement System Using Image Processsing", Y. Kudo, p. 310, Line 20 of Left Column to Line 15, Right Column.
"Real Time Measurement of Pedestrian Flow Using Processing of ITV Images" S. Takaka, Lines 11–18, Left Column p. 1 & Lines 2–11, Right Column p. 8.

Primary Examiner—Jose L. Couso
Attorney, Agent, or Firm—Antonelli, Terry Stout & Kraus

[57] ABSTRACT

An image of an elevator hall or an inside of elevator car is acquired by photographing apparatus, and the number of waiting passenger is detected by comparing the above-mentioned image with a background image when no passenger is present at the elevator hall. Second image processing apparatus with high precision is prepared by the same image information as that of first image processing apparatus, teacher information derived therefrom is compared with an output from the first image processing apparatus. If the teacher information is not coincident with the output from the first image processing means, parameters required for performing the image process by the first image processing appartus, for instance, constants, threshold values and weight coefficients employed in an image processing algorithm are adjusted.

28 Claims, 19 Drawing Sheets

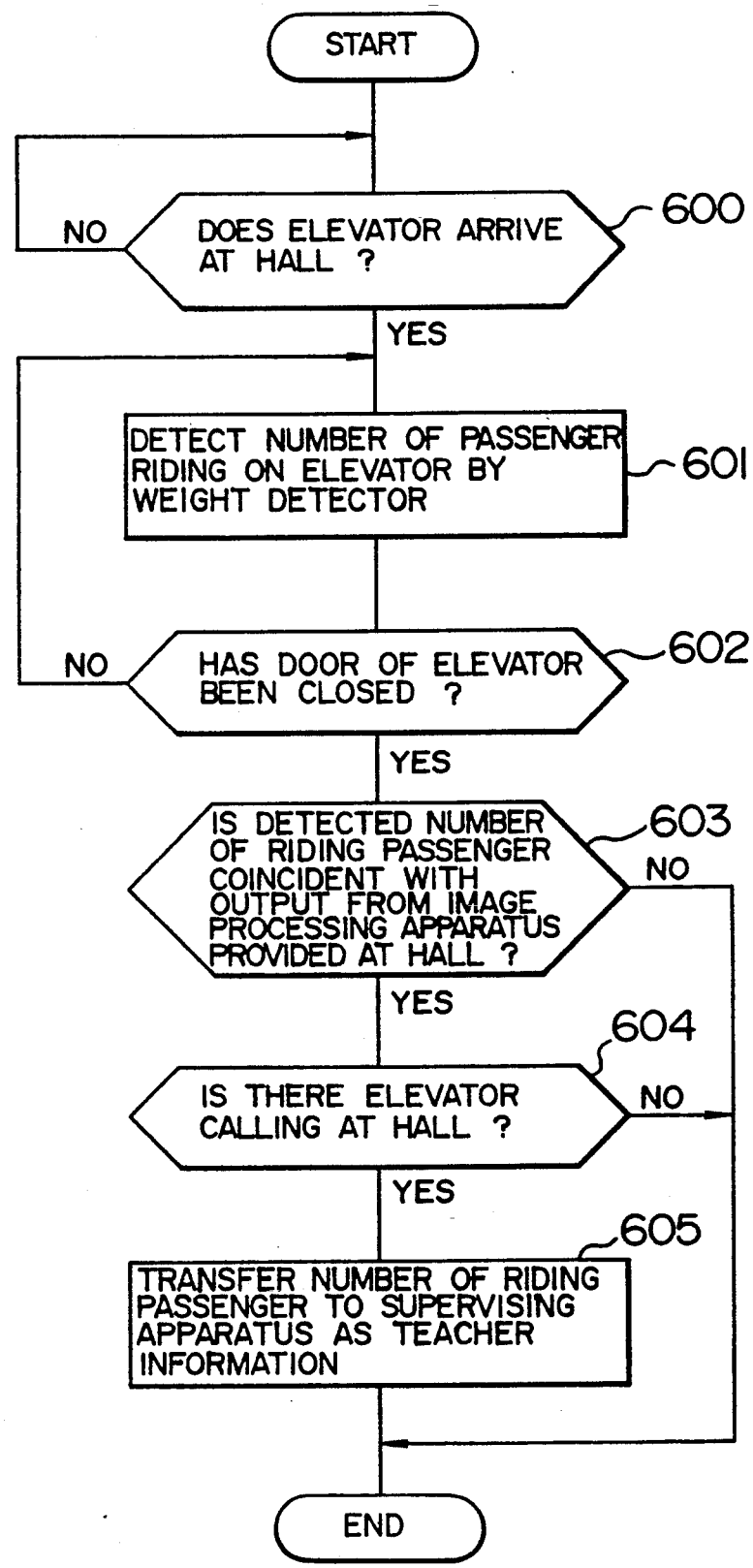

IMAGE PROCESSING APPARATUS HAVING APPARATUS FOR CORRECTING THE IMAGE PROCESSING

BACKGROUND OF THE INVENTION

1. FIELD OF THE INVENTION

The present invention generally relates to an image processing apparatus. More specifically, the present invention is directed to an image processing apparatus suitable for detecting the number of waiting passengers in a group-controlled or supervised elevator system.

2. DESCRIPTION OF THE BACKGROUND ART

Various types of apparatus for detecting an object by processing image information have been proposed. For instance, as a traffic flow measuring system for aiming at an automobile, one conventional technique has been opened in a publication of The Institute of Electronics and Communication Engineers of Japan, '85/3 Vol. J68-D No. 3, pages 308 to 315 (referred to as a "publication 1"), in which the images photographed over the highways are processed based on the algorithm with various defined constants (parameters).

Also, another conventional image processing system as an apparatus for measuring man flows has been described in another publication of The Institute of Electronics and Communication Engineers of Japan, IE80-73 (1980, 11) (referred to as a "publication 2"), in which various sorts of threshold values and weight employed in the image processing algorithm are determined by way of the learning and then the image process operation is performed by utilizing these determined threshold values and weight.

Furthermore, as disclosed in JP-A-1-241667 (referred to as a "publication 3"), when a neural network is employed in the speech recognition technique, the speech pattern whose answer has been known is inputted in the learning mode, and the weight (coupling) coefficients are corrected in such a manner that the difference between this speech pattern and the prepared answer is reduced to be zero.

As previously described, in accordance with the above-mentioned conventional techniques, there are provided a large quantity of input patterns the answers of which have been recognized with respect to the processed results, and these input patterns are repeatedly entered so as to obtain the desirable answer. As a consequence, even when the answers could be obtained with respect to the prepared input patterns, the conventional image processing apparatuses cannot follow such cases that previously unexpected changes happen to occur in the environment from which the input information can be obtained.

For instance, there is such a conventional image processing apparatus which cannot follow such an environment that variations are given to the background (will be discussed late) and then produces the incorrect outputs.

SUMMARY OF THE INVENTION

An object of the present invention is to provide an image processing apparatus capable of producing correct processed outputs by following variations in environment for an object to be image-processed under actual operation states.

Another object of the present invention is to provide such a group-controlled elevator system in which the number of passengers can be correctly grasped and the group supervising control for elevator callings may be achieved at a higher efficiency.

In accordance with one feature of the present invention, there are provided: means for generating teacher information with respect to image-processed results for an image to be processed by image processing means, and also means for correcting an image processing algorithm, or a parameter thereof based on this teacher information.

In accordance with another feature of the present invention, there are provided: means for controlling an object under control by utilizing an output of image processing means; means for producing teacher information with respect to the output from the image processing means; means for inputting both the output from the image processing means and the information from the control means, and for generating an initiating instruction to be supplied to the teacher information generating means in response to an occurrence of strange relationships between the information from the control means and the output from the image processing means; and also means for correcting either a process algorithm of the image processing means, or a parameter used in this algorithm based upon the teacher information.

It should be noted that the parameter involves a constant, a threshold value and a weight coefficient employed in the algorithm.

The image processing means processes the inputted image information, and outputs the processed image information to a control apparatus requiring the processed results.

As the teacher information generating means, either the image processing means with higher precision, for inputting the same image information as that processed by the image processing means for a processing purpose, or detecting means for inputting information other than the image and for obtaining the same sorts of outputs based on the completely different principle. If necessary, the output of the image processing means is compared with the output of the teacher information means. For instance, in case that these outputs are not coincident with each other, either the algorithm of the image processing means, or the parameters such as various sorts of threshold values and weight coefficients used in this algorithm are corrected.

In general, in an image processing apparatus for requiring simplicity and high speed processing operation, errors may be readily produced due to such variations in the environment for the object used for the image information, for instance, changes in illumination, presence of incident light, variations in background, changes in passengers clothings depending upon seasons and confusion degrees. To the contrary, in another image processing apparatus for executing a process operation with higher difficulties and requiring a high speed process operation, even when there are changes in the above-described environment, it is rather difficult to produce such errors.

As a consequence, if the former is employed as the online image processing means and the latter is utilized as the teacher information generating means, the process algorithm of the image processing means may be developed in the online mode, whereby more correct image processing operation may be achieved.

Other objects, arrangements and effects of the present invention may be apparent from the following preferred embodiments.

BRIEF DESCRIPTION OF THE DRAWINGS

FIG. 14 is a flowchart for explaining the teacher information producing operation;

DESCRIPTION OF THE PREFERRED EMBODIMENTS

Figure 1:
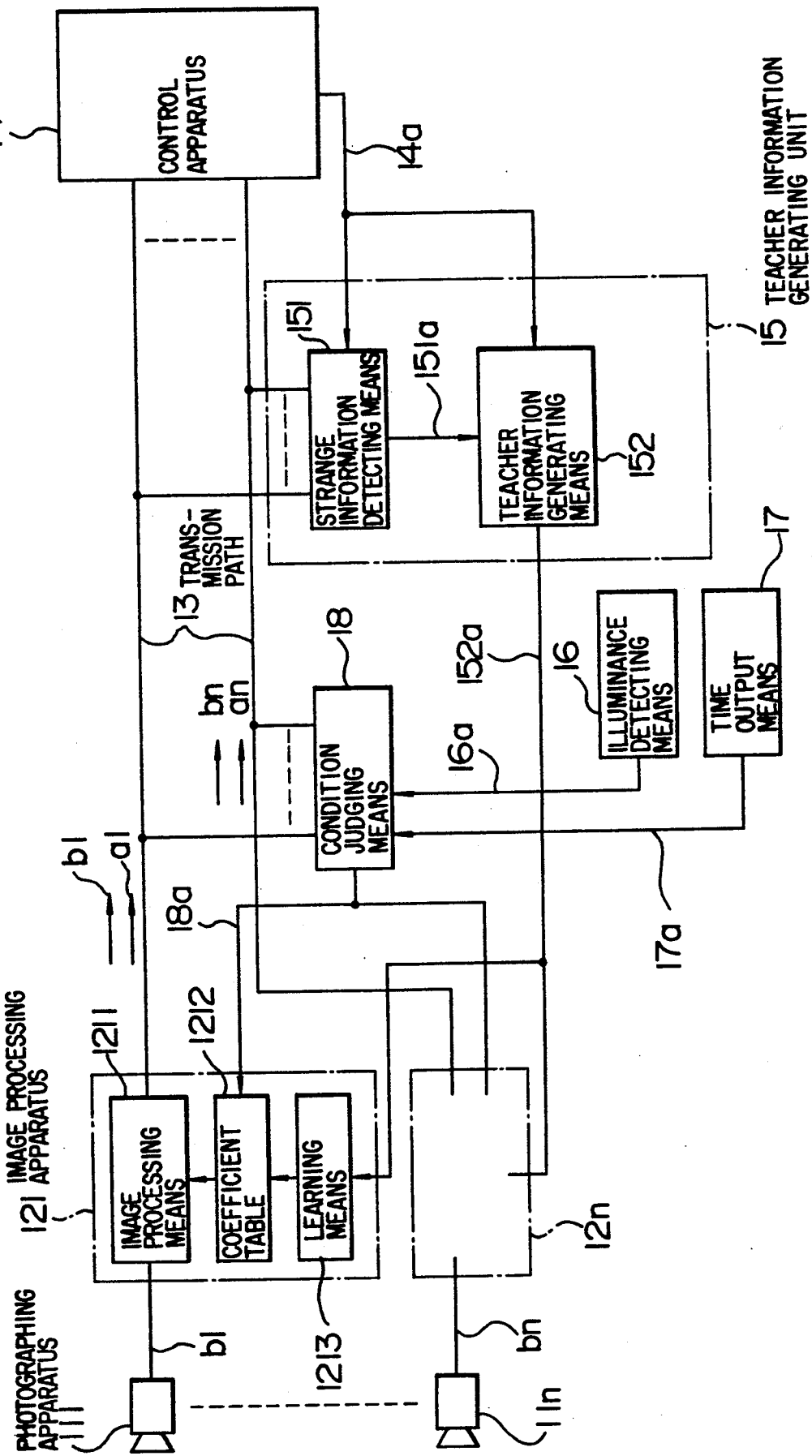
FIG. 1 is a schematic block diagram for representing a basic idea of an image processing apparatus according to the present invention.

First, with reference to FIG. 1, a basic construction of an image processing apparatus according to the present invention will now be described.

Image information photographed by a plurality of photographing (imaging) means 111 to 11n is processed in image processing apparatuses 121 to 12n, respectively. A plurality of resultant information "a1" to "an" inputted via a transmission path 13 to a control apparatus 14. This control apparatus 14 corresponds to, for instance, a group supervising (managing) control apparatus.

The above-described information "a1" to "an", and information 14a representative of operation conditions of the control apparatus 14 are inputted into a strange (suspicious) information detecting means 151 employed in a teacher (professor) information generating unit 15.

Both an output 151a of the above-described strange information detecting (sensing) means 151 and output information 14a of the control apparatus 14 are inputted into a teacher information generating means 152 employed in a teacher information generating unit 15, and an output information 152a of this teacher information generating means 152 is inputted to the image processing apparatuses 121 to 12n.

On the other hand, the above-described information "a1" to "an", an output 16a of an illuminance detecting means 16, and an output 17a of a time output means 17 are inputted to a condition judging means 18, and an output of this condition judging means 18a is inputted to the image processing apparatuses 121 to 12n.

An operation of the image processing apparatus 121 will now be described.

Image information "b1" which has been photographed, or imaged by the photographing means 111 is inputted to the image processing means 1211 of the image processing apparatus 121 so as to be processed. This process is carried out in such a manner that with employment of data stored in a coefficient table 1212, the image information "b1" is converted into either information related to such features as a quantity and a shape of an object to be detected, or processed information in which a binary process has been effected. With employment of this processed information "a1", the control apparatus 14 may control the object to be controlled in optimum states.

On the other hand, the control apparatus 14 outputs information 14a indicative of a condition of the object under control at this time instant. The above-described processed information "a1" of the image processing means 1211 is inputted into the strange information detecting means 151, and then is compared with the above-described information 14a indicative of the condition of the object under control, whereby the information is monitored.

That is to say, the strange information detecting means 151 judges whether or not the processed result made by the image processing means 1211 is coincident with the condition of the object under control. In the case when the comparison result is not coincident therewith, the strange information detecting means 151 outputs the processed information "a1" of the image processing means 1211, a signal for indicating that this processed information "a1" is strange, and also information 151a containing the image information "b1" originated from this information "a1" to the teacher information generating means 152.

The teacher information generating means 152 analyzes in detail both the strange information "a1" and the image information "b1" contained in the above-described information 151a so as to obtain correct processed information (referred to as a "teacher information" hereinafter) which corresponds to the image information "b1" photographed by the photographing means 111. This teacher information 152 is outputted to a learning means 1213 in the image processing apparatus 121.

The learning means 1213 obtains either an image processing algorithm used in the image processing means 121, or correct values for various threshold values and also weighting coefficients employed in this image processing algorithm, and then corrects contents of a coefficient table 1212 for storing therein these weighting coefficients.

Also, the teacher information generating means 152 may obtain the teacher information 152a from information 14a representative of control states of the control apparatus 14 in response to the output information 151a of the strange information detecting means 151 (will be discussed later).

Based upon the output information "a1" of the image processing means 1211, the output information "16a" of the illuminance detecting means 16, and the output information "17a" of the time output means 17, the condition judging means 18 judges environment of a photographed region aimed by the photographing means 111, and then outputs coefficient selecting information to the coefficient table 1212. The operations of this condition judging means 18 will now be explained with reference to FIG. 2.

Figure 2:
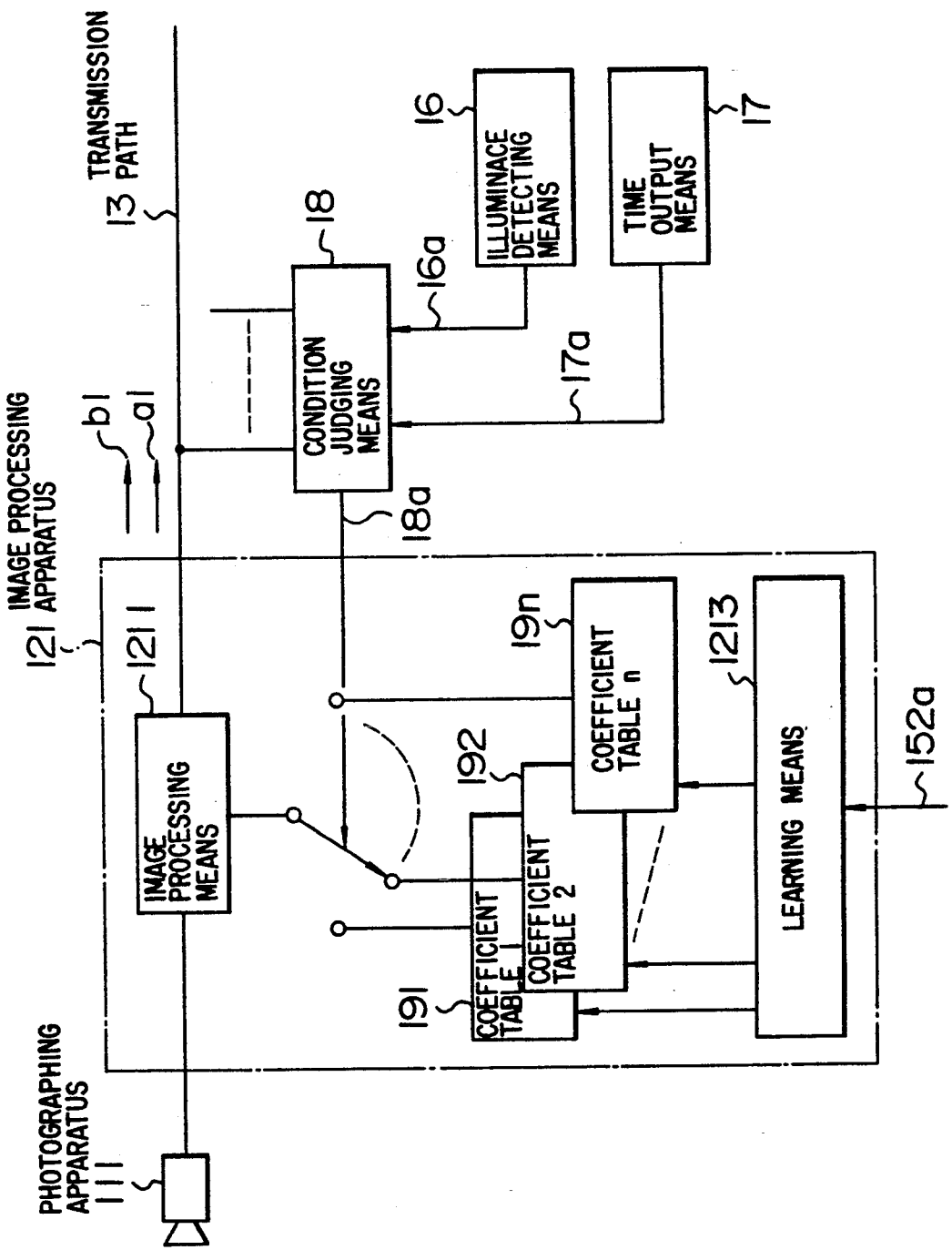
FIG. 2 is a detailed block diagram of a portion of the image processing apparatus shown in FIG. 1.

FIG. 2 is a detailed block diagram of a major portion of the above-described image processing apparatus 121 shown in FIG. 1. In this image processing apparatus 121, there are employed a plurality of coefficient tables 191, 192, - - - , 19n. A selection is made of an optimum coefficient table from these coefficient tables 191 to 19n based on the output information of the condition judging means 18.

Now, the condition judging means 18 judges from the output information "a1" of the image processing means 1211, rough information such that, for instance, whether or not a ratio of an area occupied by an object under detection to a screen area is large; judges whether or not illumination (including incident light) is bright based upon the output information "16a" of the luminance detecting means 16; or judges whether it is now evening or daytime, otherwise summer or winter based upon the output information "17a" of the time output means 17. Further, the condition judging means 18 outputs coefficient selecting information "18a" for selecting the coefficient table coincident with the above environment information.

It should be noted that the function of the learning means 1213 is to correct the contents of coefficients stored in the corresponding coefficient table under use based upon the above-described teacher information 152a, or to correct the contents stored in all of the coefficient tables with respect to the common coefficients.

Figure 3:
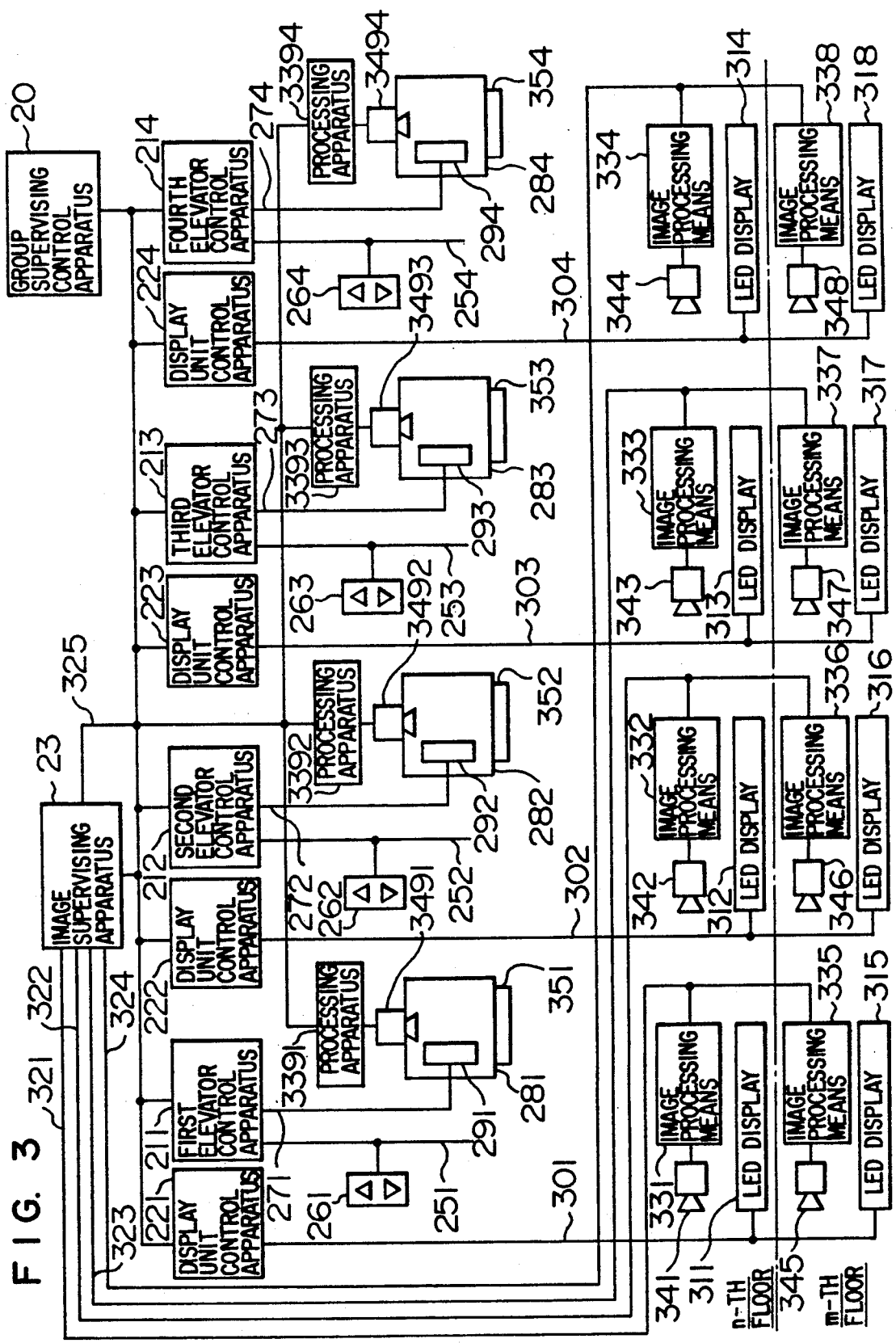
FIG. 3 is a schematic block diagram for showing an overall arrangement of a group-controlled elevator to which the image processing apparatus according to the present invention has been applied.

Referring now to FIG. 3, a group-controlled elevator system to which the image processing apparatus according to the present invention has been applied, will be described as a preferred embodiment.

In this preferred embodiment, a description will now be made of the elevator group supervising (managing) control system for managing 4 sets of elevators.

A group supervising control apparatus 20, elevator control apparatuses 211 to 214 for controlling each elevator, display unit control apparatuses 221 to 224, and an image supervising apparatus 23 are connected to a serial transmission path 24 in a multi-dropping method. Standard input/output devices such as calling buttons 261 to 264 installed in a hall are connected to one ends of the serial transmission paths connected to the respective elevator control apparatus 211 to 214. Operation panels 291 to 294 employed in cars or cabs 281 to 284 are connected to other ends of the serial transmission paths 271 to 274.

Also, to transmission paths 301 to 304 connected to the display unit control apparatuses 221 to 224, LED (light emitting diode) display units 311 to 318 to be positioned at a n-th floor and an m-th floor of a building are connected.

Similarly, image processing apparatuses 331 to 338 to be positioned at the n-th and moth floors are connected to the series transmission paths 321 to 324 connected to the image supervising apparatus 23. Photographing means 341 to 348 are connected to the respective image processing apparatuses 331 to 338. Image processing apparatuses 3391 to 3394 to be positioned at each car of the elevators are connected to another serial transmission path 325. Photographing means 3491 to 3494 are connected to the respective image processing apparatuses 3391 to 3394. Reference numerals 351 to 354 denote weight detecting means employed in the respective cars.

Operations of the above-described group-controlled elevator system with the above-mentioned arrangements will now be described.

The group supervising control apparatus 20 receives the information derived from the calling buttons 261 to 264 installed at the hall and also the operation panels 291 to 294 provided within the cars via the respective elevator control apparatuses 211 to 214. Also, the group supervising control apparatus 20 receives via the image supervising apparatus 23 both the number of waiting visitors which have been detected by the image processing apparatuses 331 to 338 installed at the n-th and m-th floors, and the number of passengers within the cars which have been detected by the image processing apparatuses 3391 to 3394, and then controls operations of these elevators based on the above-described various information. The display unit control apparatuses 221 to 224 output guide information to the display units 311 to 318 installed at the n-th and m-th floors in order to provide services to these waiting visitors (passengers).

It should be understood that the above-described image processing apparatuses 331 to 338 and 3391 to 3394 perform simple and rough processing operations for the sake of simplifying the software used in this system, of the transmission velocities and also processing velocities.

The elevator control apparatuses 211 to 214 controls operations of the elevators and also the input/output devices employed in the respective floors and cars based upon the instructions issued from the group managing control apparatus 20.

Figure 4:
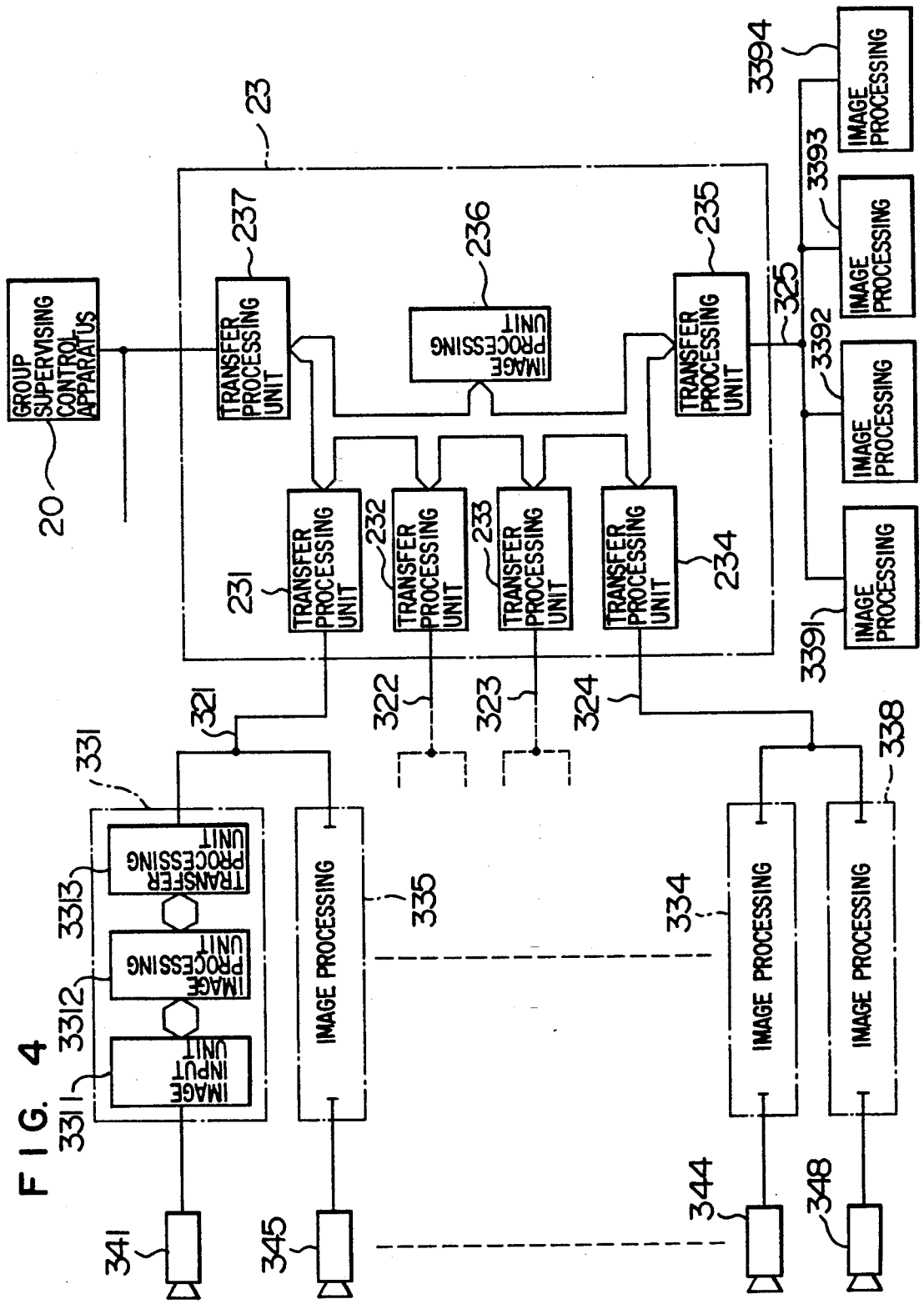
FIG. 4 is a detailed block diagram of a major portion of the group-controlled elevator shown in FIG. 3.

FIG. 4 is a detailed block diagram of a major portion of the system shown in FIG. 3, consisting of mainly the image supervising apparatus 23.

The image processing apparatus 331 is arranged by an image input unit 3311, an image processing unit 3312, and a transfer processing unit 3313. The image input unit 3311 converts image information (analog amount) outputted from the photographing means 341 into a corresponding digital amount. Based upon this digital amount, a detection is made of the number of passengers who wait at an elevator hall. In other words, based on the relationship between a background image which has been taken at a time instant when no passenger exists in the elevator hall, and also image information taken at an arbitrary time instant after the first-mentioned time instant, such a process operation is executed so as to obtain a quantity of visitors present in this image information. Since this process operation is used for the on-line control, a high speed characteristic is demanded and therefore it may be rough process operation.

The transfer processing unit 3313 transmits the information on the waiting passengers acquired in the above-described method to the image supervising apparatus 23 in accordance with a predetermined format. This image supervising apparatus 23 corresponds to the teacher information generating unit 15 shown in FIG. 1. This image supervising apparatus 23 receives the information about the number of the waiting passengers via the transfer processing units 231 to 235 from the respective image processing apparatuses 331 to 338 and 3391 to 3394. The image processing unit 236 arranges the received information and transmits the arranged information via the transfer processing unit 237 to the group supervising control apparatus 20. As a result, the group supervising control apparatus 20 controls to allocate the cars of the elevators based on the quantity of waiting passengers at the n-th and m-th elevator halls and also the total number of passengers present in the cars, and thus performs the proper group managing control. On the other hand, in the case when strange information is present, the image information which has been used to be processed is acquired from a memory (not shown) employed in the relevant image processing apparatus, and a further detailed process operation thereof will be executed by the image processing unit 236. As a result, the resultant correct information, namely teacher information is transmitted to the group supervising control apparatus 20 and also to the image processing apparatus from which the above-described strange information has been outputted. It should be noted that with respect to an algorithm for a detailed process operation, for instance, the algorithm as described in the publication 2 may be utilized.

The image processing apparatus which has outputted the above-described strange information, corrects parameters used for the process operation, i.e., various sorts of threshold values and also weighting (coupling) coefficients in order to reduce deviation between the detected results and the correct information (teacher information), whereby detecting precision may be increased. A detailed operation of this parameter correction will be described later.

Figure 5:
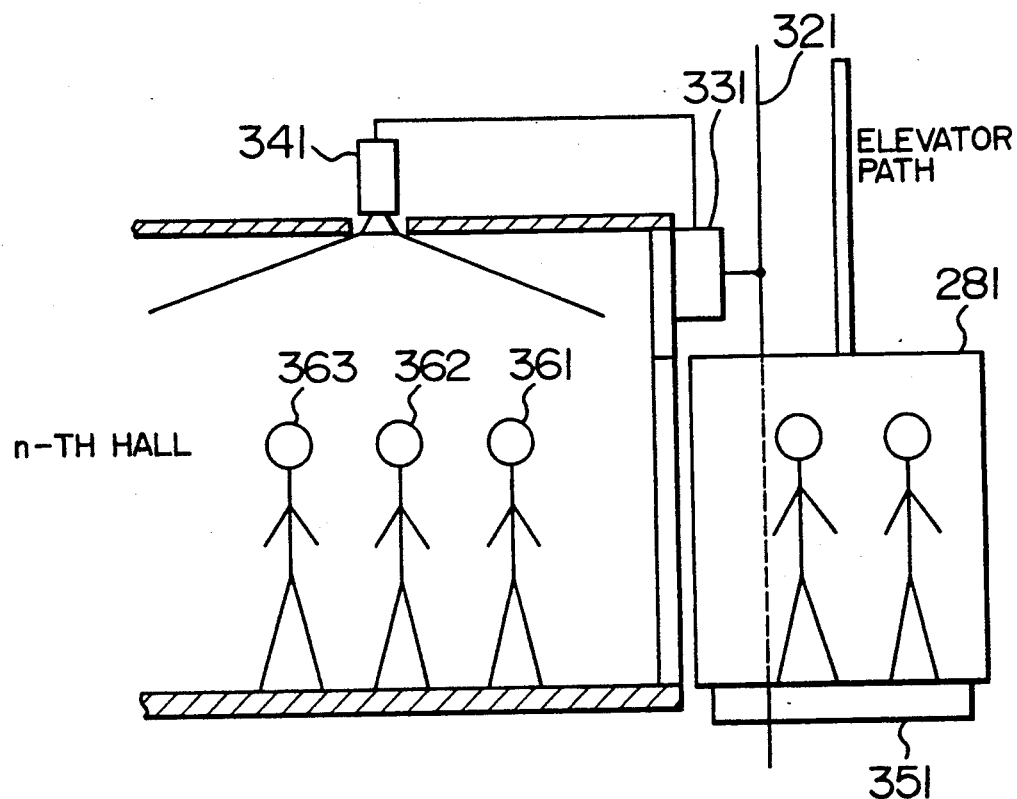
FIG. 5 is a cross-sectional view for showing an elevator hall in which a detector for detecting the number of waiting visitors is installed.

FIG. 5 represents a setting condition of the image processing apparatus according to the preferred embodiment.

The photographing means 341 is set on a ceiling of an elevator hall at an n-th floor, and this image processing apparatus 331 is installed within an elevator path or guide rail along which a car 281 of the elevator is transported, and also an imaging signal cable is employed so as to connect the photographing means 341 and image processing apparatus 331 with each other. Then, the image processing apparatus 331 is connected to the transmission path 321 provided within the elevator path, and thus transfers the information via this transmission path 321 to the image supervising apparatus 23.

Under such a setting condition, a method for detecting, for instance, waiting visitors 361 to 363 at this hall will now be explained.

Figure 6:
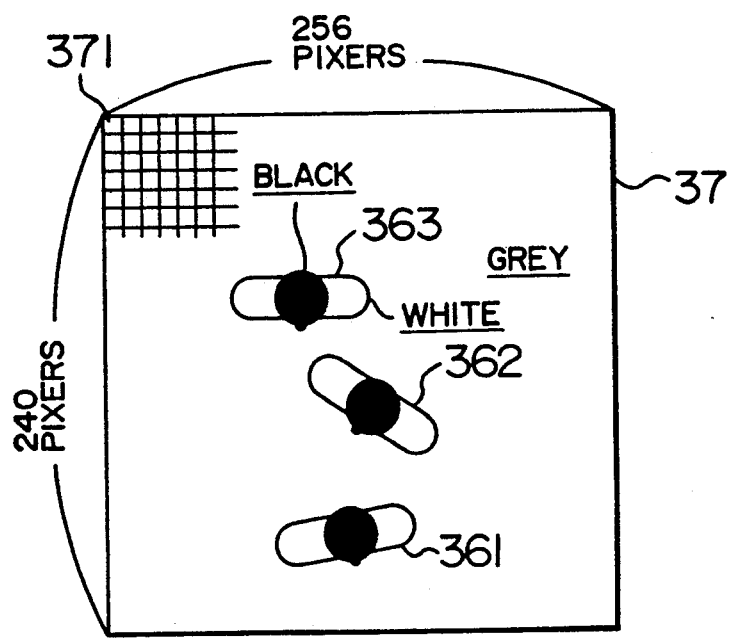
FIG. 6 illustrates an example of an imaged screen.

In FIG. 6, there is shown an image imaged by the photographing apparatus 341, in which a screen 37 is so arranged that 256 unit pixels are arranged in a horizontal direction, whereas 240 unit pixels are arranged in a vertical direction.

It should be noted that although total numbers of pixels of photographing apparatuses are different from each other, resolution of the image input unit 3311 in this preferred embodiment is defined by 256×240 pixels. Furthermore, it is assumed in this drawing that the background corresponds to gray, e.g., the binary number indicative of 128; the head portion corresponds to black, e.g., the binary number of 0; and the cloth corresponds to white, e.g., the binary number of 255.

Figure 7:
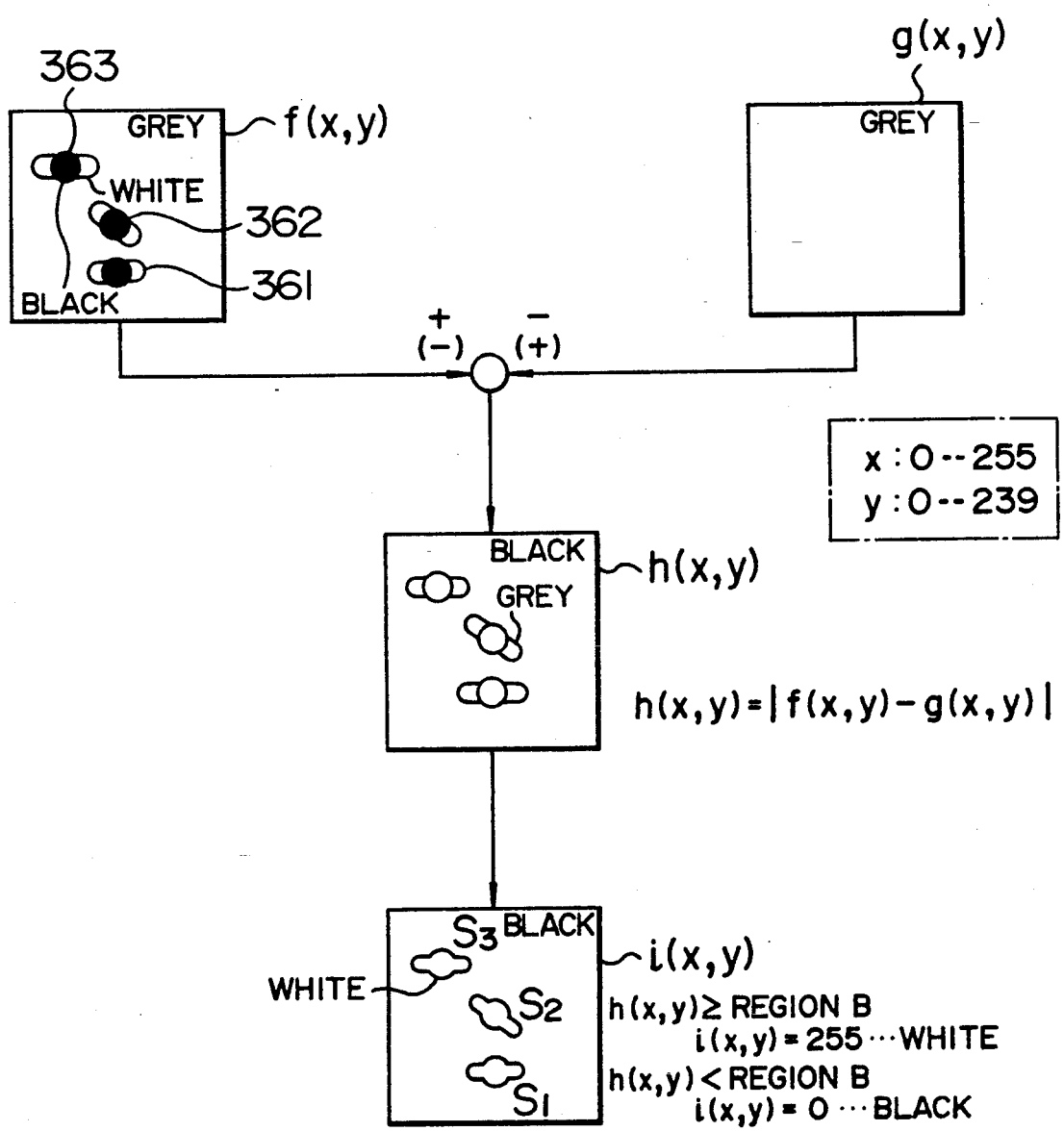
FIG. 7 illustratively explains an image processing sequence for obtaining the number of waiting visitors from the imaged screen.

FIG. 7 pictorically represents the processing operations of the image processing apparatus 331.

The image processing apparatus 331 first obtains a difference image h (x,y) expressed by the following equation with employment of the background image g (x,y) which was acquired at the time instant when no visitor or passenger is present during the initiation operation, and also the image information f (x,y) which has been acquired at an arbitrary time instant after the acquisition of the background image g (x,y):

$$h(x,y) = |f(x,y) - g(x,y)|.$$

As a result, the background portion becomes black and the object becomes gray. Subsequently, this image is compared with the proper threshold value "B" and then a binary image i(x,y) indicated by the below-mentioned formulae is obtained. As a consequence, the background portion becomes black and the object becomes white.

h(x,y) ≧ B region:
   i(x,y) = 255 . . . white.
h(x,y) < B region:
   i(x,y) = 0 . . . black,
where symbol "x" indicates 0 to 255 and symbol "y" denotes 0 to 239.

An area (pixel number) "$S_k$" occupied by the object is obtained from the above-described binary image based upon the white pixel number, and this calculated area is divided by a pixel number "S" per one passenger so as to calculate the number of passengers "Nm" based upon the following equation:

$$Nm = \frac{\sum_{k=1}^{n} S_k}{S}$$

Assuming now that, for instance, the area for the waiting visitor 361 is $S_1$, that for the visitor 362 is $S_2$ and that for the visitor 363 is $S_3$ as shown in FIG. 7, "n" in the above-described formula becomes 3.

The numbers of waiting visitors in the cars 81 to 284 are obtained in the similar method.

Figure 8:
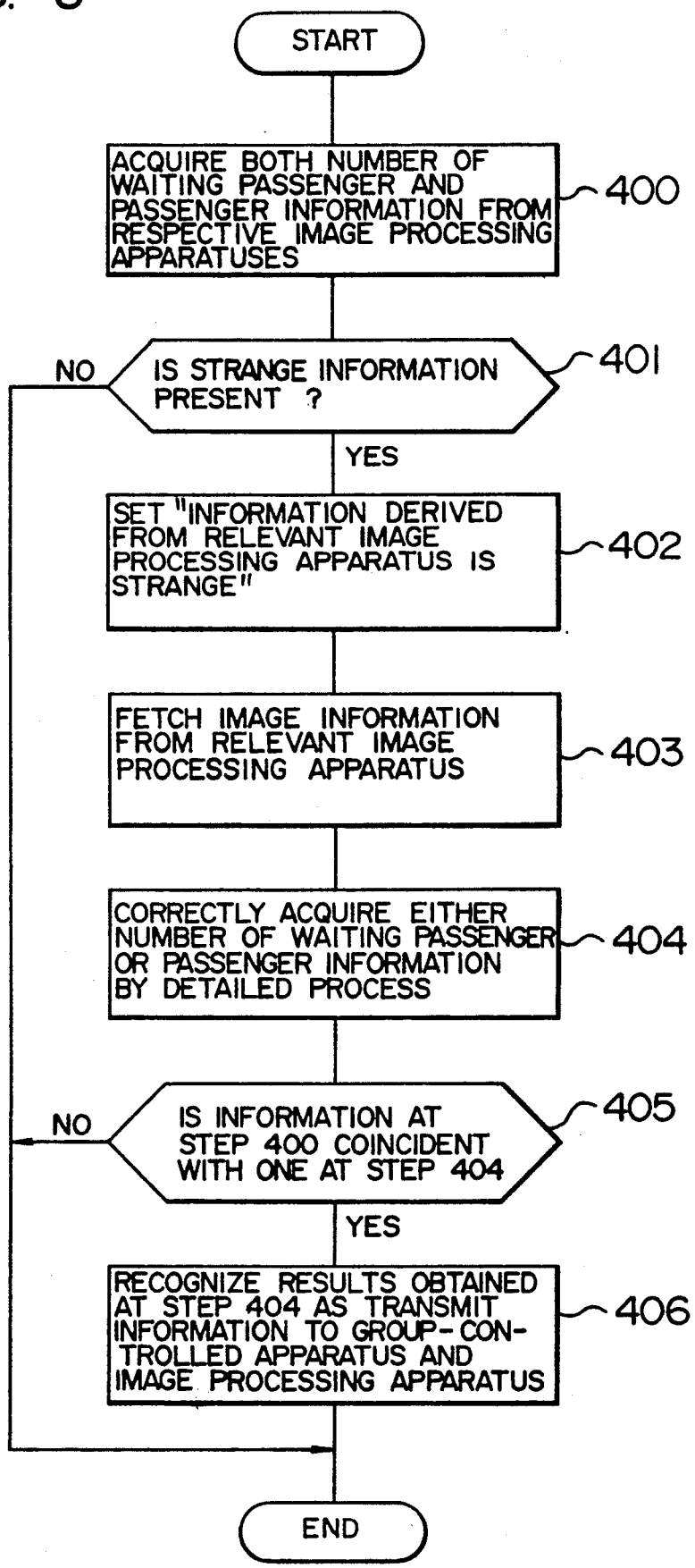
FIG. 8 is a flowchart for explaining an image processing operation of an image supervising apparatus according to one preferred embodiment.

The above-explained process operations of the image supervising apparatus 23 are expressed by a flowchart shown in FIG. 8.

That is, the information about both the waiting visitors and the passengers is acquired from the respective image processing apparatuses 331 to 3312 at a step 400, and then is arranged and stored in a transmission memory (not shown) of the transfer processing unit 237 shown in FIG. 4. At a step 401, a judgement is made whether or not strange information is present by comparing the above-described information with the present elevator operating conditions. As a result, if the strange information exists, a message that the information derived from the relevant image processing apparatus is strange is first set to the transmission memory of the transfer processing unit 237 at a step 402. Subsequently, the image information is taken out from the corresponding image processing apparatus at a step 403, and this image information is processed more in detail at a step 404 so as to correctly obtain either the waiting visitors, or the number of passengers.

At a step 405, a comparison is made between the information of the corresponding image processing apparatus acquired at the step 400 and the teacher information obtained at the previous step 404. In the case when the comparison result becomes incoincident, the results obtained at the step 404 are stored into the transmission memories (not shown) of the relevant transfer processing units 237, and 231 to 235. As a consequence, the correct information may be transferred to the group supervising control apparatus 20 and the parameters of the relevant image processing apparatuses such as threshold values may be corrected.

Figure 9:
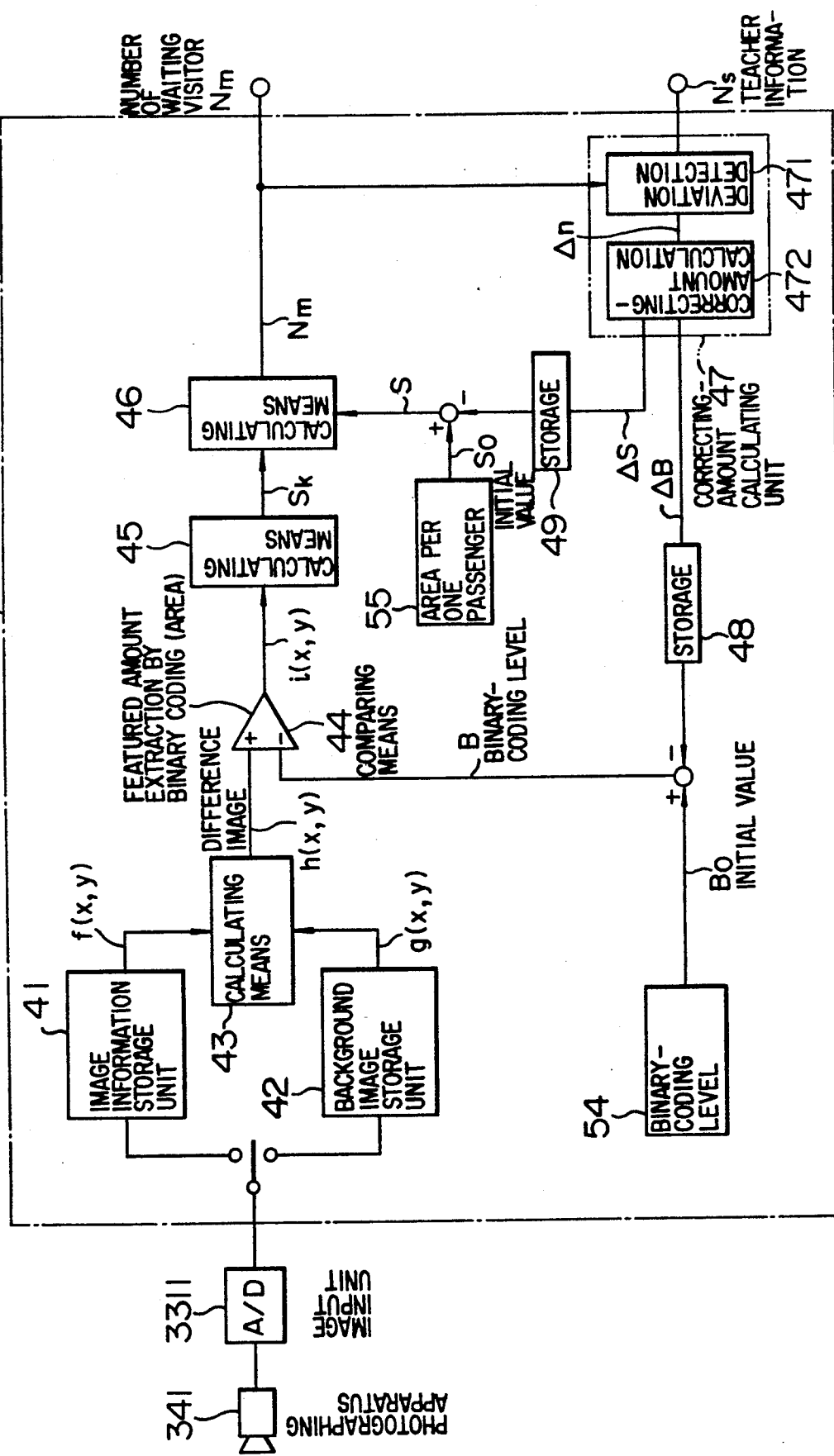
FIG. 9 explanatorily shows a process for correcting parameters of an image processing algorithm according to one preferred embodiment.

Referring now to FIG. 9, one example of a process for correcting threshold values employed in the image processing algorithm for the image processing apparatus 331 will be explained.

In general, the image processing unit 3312 converts the image information inputted from the photographing apparatus 341 into the digital amount at the image input unit 3311, and stores the digital amount into the image information storage means 41. Based upon this image information "f(x,y)" and the background image information "g(x,y)" which has been previously stored in the background image storage means 42, a calculation means 43 obtains the difference image "h(x,y)". The comparing means 44 compares this calculation result with a proper binary-coding level "B" to obtain a binary-coded image i(x,y). Based on this binary-coded image i(x,y), the area $S_k$ occupied by the object is obtained by a calculating means 45. The calculated area "$S_k$" is divided by an area "S" per one visitor in a calculating means 46, so that the number of waiting visitors "Nm" is obtained. As a consequence, as adjusting elements (parameters) in this preferred embodiment, there are conceived both the binary-coding level "B" and the area "S" per one visitor.

Then, when the image supervising apparatus 23 judges that the calculated visitor's number is incorrect, and thus transmits the teacher information "$N_s$", the image processing unit 3312 performs learning by utilizing idle time for detecting the number of visitors. That is, a deviation detecting means 471 employed in a correcting-amount calculating means 47 obtains deviation between the number of waiting visitors "Nm" and the teacher information "$N_s$". In a connecting-amount calculating means 472, a correcting amount is calculated in such a manner that if the above-described deviation "Δn" is positive (or negative), the above-described binary-coding level "B" is set to be higher (or lower), otherwise the area "S" per one visitor is set to be larger (or smaller). The deviation Δn is expressed by the following equation (1):

$$\Delta n = Nm - Ns \quad (1).$$

Based on this deviation Δn, either an adjusting value "ΔB" or "ΔS" obtained in the calculating means 472 is subtracted from an initial value "$B_0$" or "$S_0$" set in the corresponding setting means 54 or 55, or added thereto. The resultant value is stored in the respective storage means 48 or 49 and held therein until the subsequent teacher information "$N_s$" is inputted. The above-described method for correcting two threshold values "B" and "S" based on the deviation Δn, has such a difficulty that distribution of two different correcting amounts becomes complex. Therefore, another method capable of simply correcting the two threshold values will now be explained.

First of all, the area "S" per one visitor is fixed and then the binary-coding level "B" is adjusted. That is to say, a value "$S_{k0}$" required for making the number of waiting passenger "Nm" coincident with the teacher information "$N_s$" is obtained by way of the following equation (2) in the correcting-amount calculating means 472:

$$S_{k0} = N_s \cdot S_0 \quad (2)$$

Thus, the binary coding process is repeated until an area "$S_k$" of white which has been binary-coded, approximates to the value "$S_{k0}$" while changing the adjusting value ΔB. In other words, according to the calculating means 472, the area "S" per one passenger which is required to make the number of waiting passenger "Nm" coincident with the teacher information "$N_s$", is obtained from the following equation (3), and further the adjusting value ΔS is calculated by the following equation (4):

$$S = S_k / N_s \quad (3),$$

$$S = S - S_0 \quad (4).$$

Although the binary-coding level "B" was first adjusted in the above-described preferred embodiment, the area per one passenger may be adjusted prior to the level adjustment. Alternatively, only one of these binary-coding level and area per one passenger may be adjusted.

Since both the binary-coding level and the area per one visitor may be adjusted to be optimum values in accordance with this preferred embodiment, the output of this elevator managing system may be improved in that this output approximates to the teacher information "$N_s$".

Figure 10:
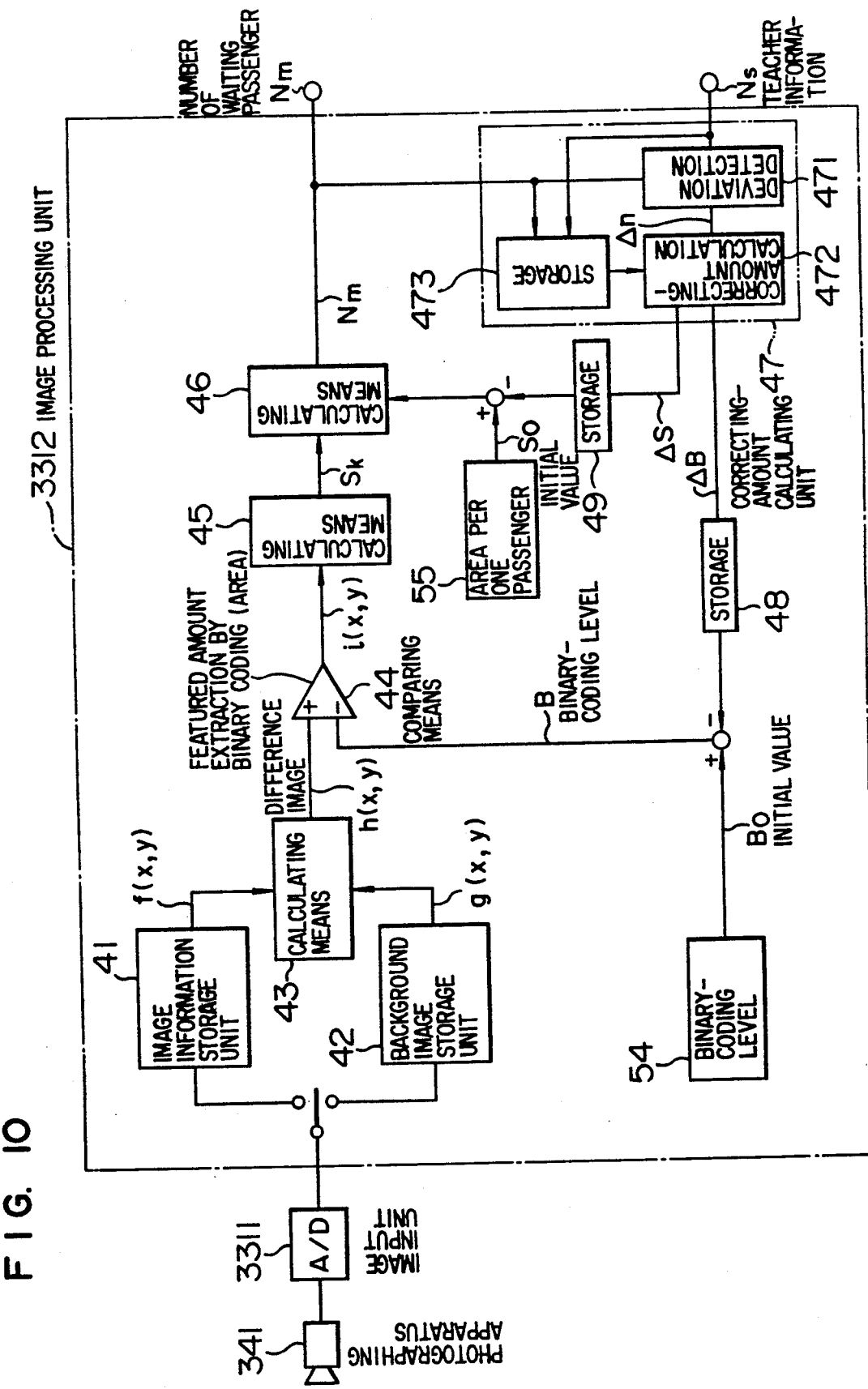
FIG. 10 explanatorily shows a process for correcting parameters of an image processing algorithm according to another preferred embodiment.

Referring now to FIG. 10, a procedure for correcting threshold values according to another preferred embodiment will be explained.

There are some possibilities in the above-described preferred embodiment shown in FIG. 9 that the corrections are not optimized, because the threshold values are corrected at only one time instant when the strange data happens to occur, and also no care is taken for distributing a plurality of correcting amounts.

In another preferred embodiment, a means 473 for storing both the number of waiting passenger "Nm" and the corresponding teacher information "$N_s$" is additionally employed in addition to the various circuit means of the previous preferred embodiment, so that after input-/output characteristics of the image processing apparatus 331 have been grasped, corrections of threshold values are performed. As a result, such threshold value corrections may be optimized.

The storage means 473 temporarily stores therein both the waiting passenger information "Nm" outputted from the image processing unit 3312 and the teacher information "$N_s$" inputted when a judgement is made that this waiting passenger information "Nm" is strange.

Subsequently, the correcting-amount calculating means 472 learns what difference the above-described waiting passenger information has with respect to the answer (teacher information). As a result, the input/output characteristic of the image processing unit 3312, namely the unit per se may be grasped.

Figure 11:
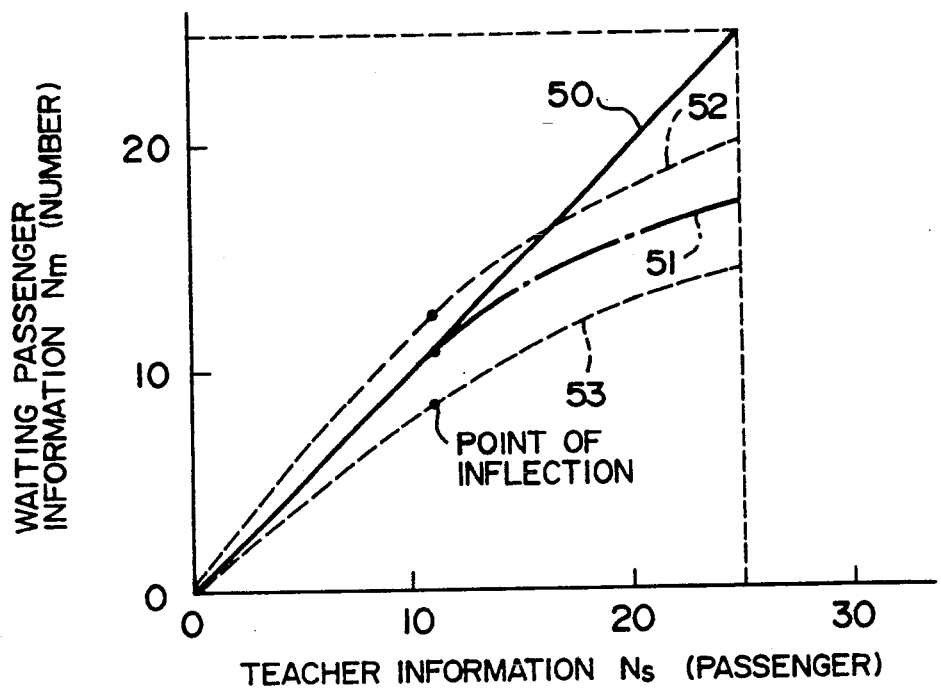
FIG. 11 is an explanatory diagram of the parameter correcting operation.

FIG. 11 is a characteristic representation for the thus obtained input/output characteristics. Assuming now that for instance, a field angle of the photographing means is selected to be 120° and also a setting position thereof is selected to be 3 meters from the floor plane, approximately 25 passengers (including head portions) may be detected by the photographing means at maximum.

Accordingly, as shown in a solid line 50 of FIG. 11, the waiting passenger information is preferably extended in a linear fashion up to 0 to 25 passengers under an ideal state.

However, even when the coefficients and the like have been actually optimized, if the number of waiting passengers is increased, an error may occur as represented in a dot and dash line 51 because an image overlapping phenomenon will occur.

In case that a sharp difference image may be readily obtained due to various conditions of background or lighting, as represented by a dot line 52, an output higher than the output denoted by the above-described dot and dash line 51 is produced, whereas an output lower than that denoted by the dot and dash line 51 is produced when a obscure difference image is obtained.

Therefore, after the input/output characteristics of the image processing apparatus at the actual setting place have been learned by the teacher information "$N_s$", a point of inflection is obtained from the input-/output characteristics, namely the number of waiting passengers is calculated when the overlap phenomenon occurs.

The correction is carried out based upon the teacher information "$N_s$" which is entered after the above-described process operation has been accomplished. In other words, when the teacher information "$N_s$" corresponds to the number of waiting passenger below than the point of inflection, the correction is executed in the similar method to that of the previous embodiment, whereby both an optimum binary-coding level "B" and an area $S_1$ per one passenger are obtained. As a result, an input/output characteristic after the corrections have been executed approximates to the curve indicated by the dot and dash line 51.

Next, when the teacher information "$N_s$" corresponds to the number of waiting passenger higher than the point of inflection, an optimum area $S_2$ per one passenger is obtained. As a consequence, an input/output characteristic approximates to the solid line 50.

After the above-described process has been completed, both a single binary-coding level "B" and two sets of areas $S_1$ and $S_2$ per one passenger are obtained.

Thus, the process is first carried out with employment of the binary coding level "B" and the area $S_1$ per one passenger, and thereafter if this result corresponds to the number of waiting passengers higher than the point of inflection, the area per one passenger is substituted by "$S_2$", whereby the process is again performed.

In accordance with this preferred embodiment, since the optimum corrections may be achieved by performing less process operation, there is no case that the detecting results become unstable (i.e., the corrections are repeated).

Figure 12:
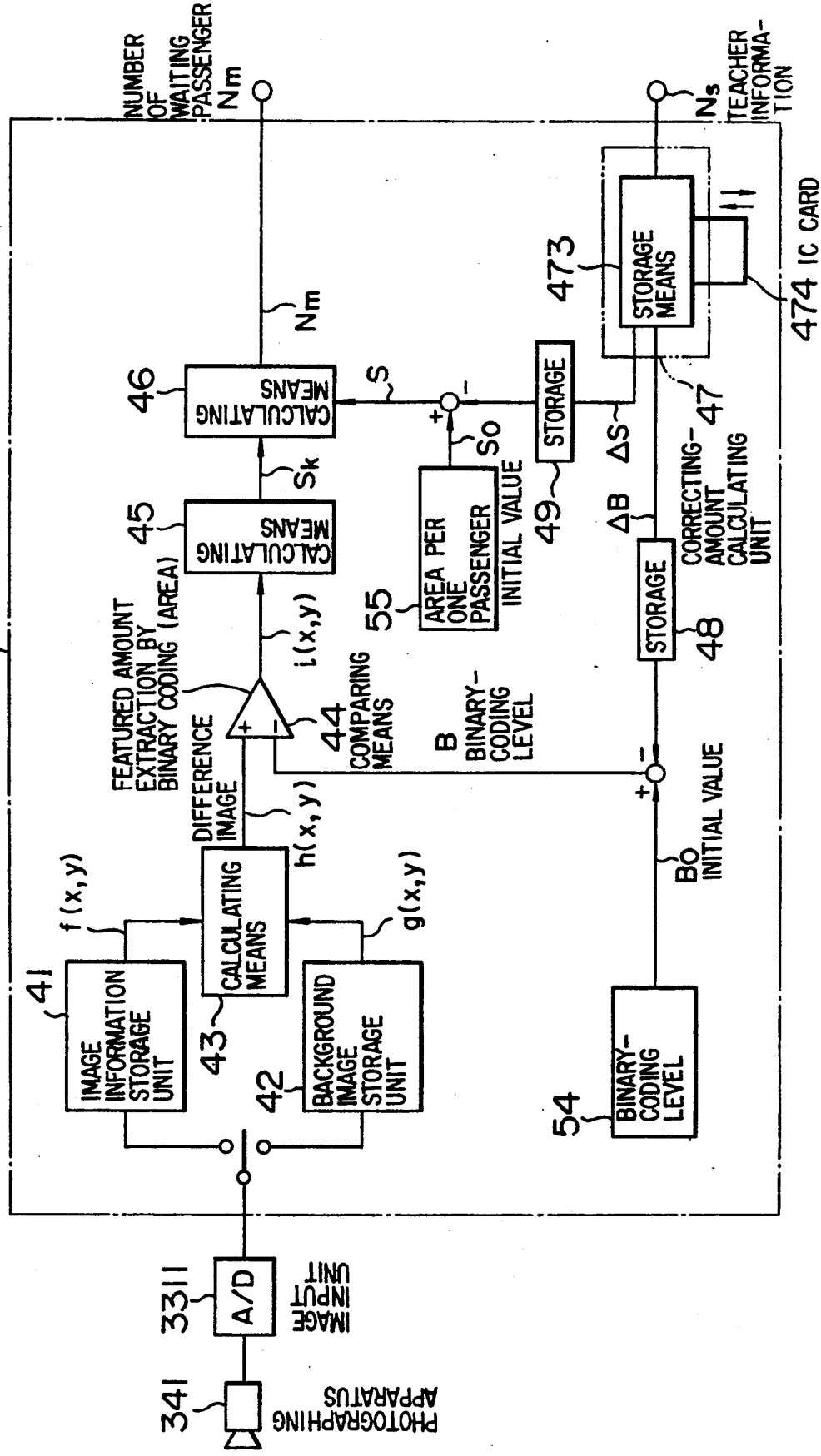
FIG. 12 explanatorily represents a process for correcting parameters of the image processing algorithm according to a further preferred embodiment.

In FIG. 12, there is shown a further correcting method according to the present invention.

This preferred embodiment corresponds to the previous preferred embodiments shown in FIGS. 9 and 10 in which a correcting amount calculating unit 47 is constructed by a storage means 473 only. This storage means 473 comprises an external detachable storage medium, for instance, an IC card 474.

With this arrangement, for instance, a person refers to a content of a nonvolatile memory (IC card) 474 and performs the corrections at other place in accordance with the processing method as represented in FIG. 10. The result of this correction is stored in another storage region of the nonvolatile memory and the nonvolatile memory is again mounted on the apparatus.

As a result, the corrected contents correspond to $\Delta B$ and $\Delta S$ as shown in FIG. 12.

According to this preferred embodiment, since the cumbersome corrections are performed by a person, the more accurate corrections may be achieved and the overall arrangement of the apparatus may be furthermore simplified.

Figure 13:
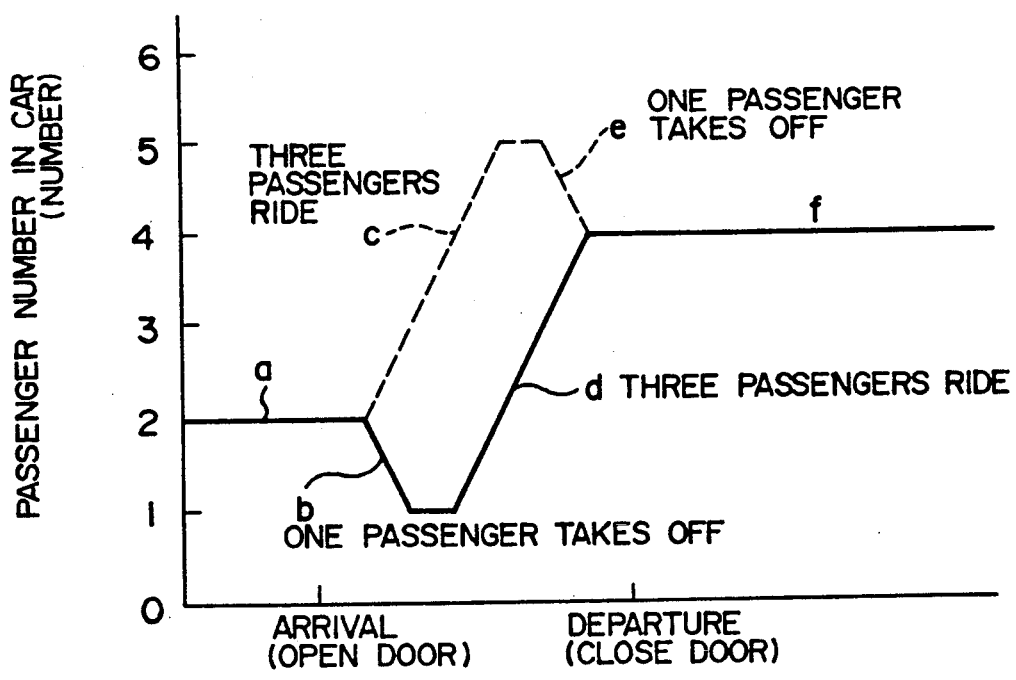
FIG. 13 explanatorily shows a means for producing teacher information with respect to a quantity of waiting visitors at an elevator hall by employing a weight detector.

Referring now to FIGS. 13 to 14, teacher information generating means according to another preferred embodiment of the present invention will be described. In this preferred embodiment, both algorithms and parameters for the image processing apparatuses 331 to 3312 are corrected with employment of outputs from weight detectors 351 to 354 provided within cars of elevators.

A differential transform type weight detector for detecting weight of passengers is mounted under a floor of a car or cab of an elevator. An elevator control apparatus performs various controls by utilizing outputs from this weight detector. For instance, it is normally understood that precision on a passenger converting output for this weight detector is ±0.1 passenger, and therefore may be sufficiently utilized as the teacher information generating means according to the present invention.

To adjust the image processing apparatuses 331 to 338 mounted in a hall by the outputs derived from the weight detectors 351 to 354 of the cars, it should be checked how many persons are present in this hall, namely how many passengers have ridden the cars.

As represented in FIG. 5, it is now assumed that, for instance, two passengers ride the car, three visitors are waiting for the elevator at the n-th hall, one passenger takes off the car at the n-th hall and also three visitors ride the car. The output from the weight detector 351 provided with the car 281 varies, as represented in FIG. 13, a state "a" of two passengers; a state "b" under which one passenger takes off (or a state "c" under which three passengers ride); a state "d" under which three passengers ride (or a state "e" under which one passenger takes off the car 281); and a state "f" under which 4 passengers ride in this order. When a period "d" (or "c") indicative of a positive gradient is extracted from the graph shown in FIG. 13, a total number of visitors who have ridden the car, namely a total number of visitors which are waiting for the arrival of this car 281 may be grasped. As previously described, if an attention is given to a time period "T" defined by one time when the elevator has arrived at the n-th hall and also the other time when the elevator departs therefrom, the total number of visitors who had waited for the elevator at the n-th hall before the arrival of the elevator may be surely detected by detecting the weight within the car. It should be noted that since this weight detection timing is rather delay, the detected weight cannot be directly utilized for the group supervising control of the elevator, but may be usefully utilized as the teacher information generating means.

A process flowchart, shown in FIG. 14, of the group supervising control apparatus 20 for causing the calculated number of riding passengers to be used as the teacher information will now be described.

From a time instant where confirmation is made whether or not the elevator has arrived at the n-th hall at a step 600, a detection is commenced to check the number of visitors who ride the elevator at a step 601. Then, this number detecting process is continued until a next step 602 where confirmation is established that the door of the elevator is closed. Subsequently, when it is confirmed that the door of the elevator is confirmed at the step 602, a comparison is then made between the total number of visitors who have ridden therein, calculated at the previous step 603 (see FIG. 13), and also the detection result of the image processing apparatus 331 mounted in the hall. If this result is coincident with the calculated visitor's number, this process is completed, and no teacher information is outputted. To the contrary, if this result is not coincident with the visitor's number, a check is made at the step 604 that no visitor remains at the hall by sensing no call at this hall. Then, the above-described number of visitors who have ridden the elevator is outputted as the teacher information to the supervising apparatus 23.

In accordance with this preferred embodiment, since the weight detectors which have been previously installed on the cars of the elevators are utilized as the teacher information output means, there is no need to newly employ the above-described teacher information output means, and therefore the reliable teacher information with the acceptable precision may be acquired.

It should be noted that the image processing apparatuses 3391 to 3394 mounted on the respective cars can detect the number of passengers present within these cars under such a condition that the doors of these cars are closed, and thus the passenger's number may be detected at higher precision since the environment is always constant. Accordingly, these image processing apparatuses may be employed as the teacher information generating means instead of the weight detector.

Figure 15:
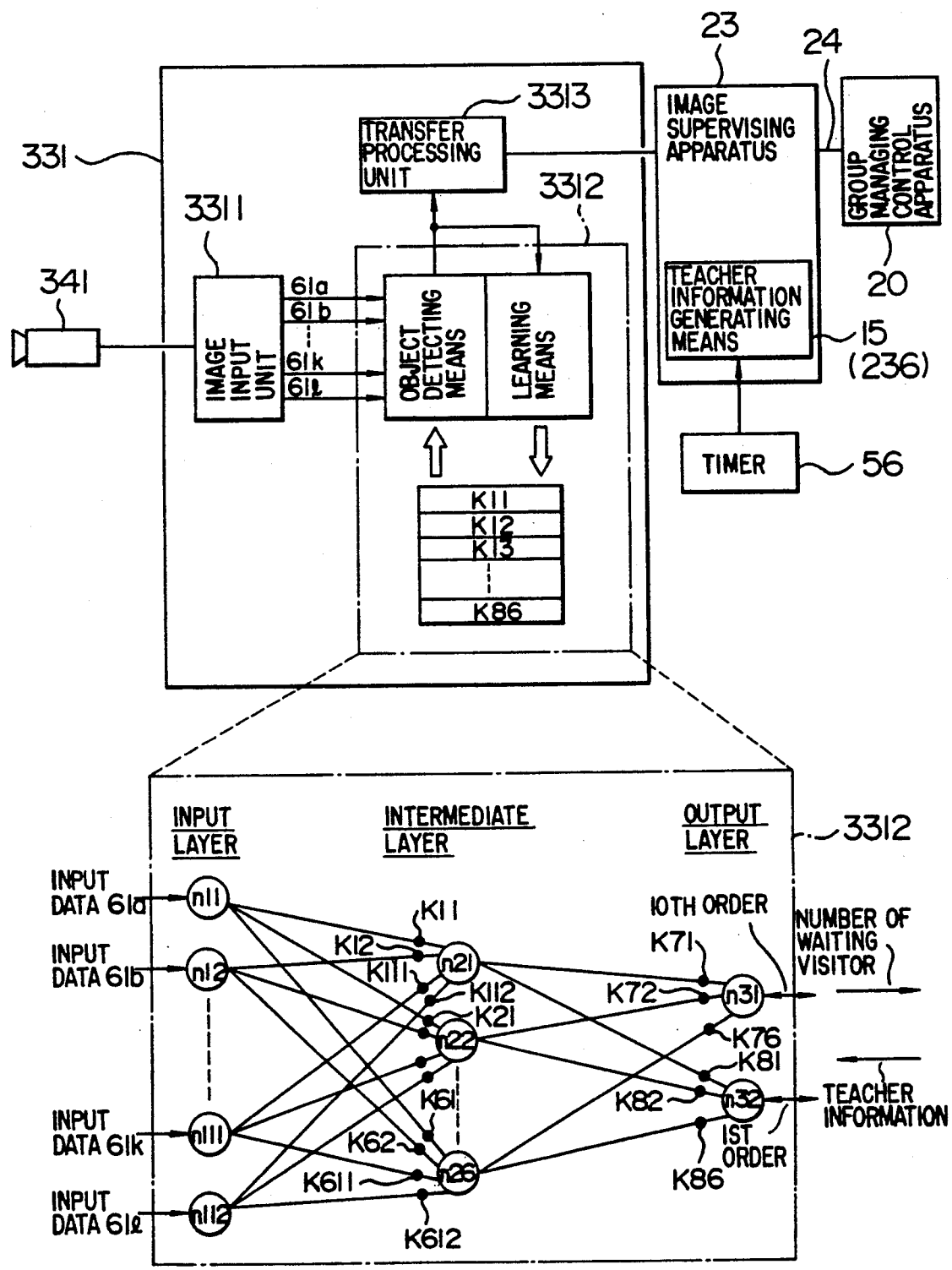
FIG. 15 is a schematic block diagram for showing a major arrangement of a system in which an image processing apparatus with employment of a neural network, according to the present invention, has been employed as the detector for detecting the number of waiting visitors for the group-controlled elevator.

Referring now to FIG. 15, another method for detecting the number of visitors who are waiting for elevators at elevator halls, according to a further preferred embodiment of the present invention, will be described. This preferred embodiment is realized in such a way that the image processing unit 3312 is arranged by a neural network.

The number of visitors waiting for the elevators is detected by inputting a plurality of input data 61a to 61l derived from the image input unit 3311 into the image processing unit 3312 arranged by the neural network, which will now be described more in detail.

The neural network is constructed of an input layer, an intermediate layer and an output layer. Furthermore, the input layer is arranged by 12 neurons $n_{11}$ to $n_{112}$; the intermediate layer is constructed of 6 neurons $n_{21}$ to $n_{26}$; and the output layer is arranged by two neurons $n_{31}$ to $n_{32}$. The outputs of the respective neurons constituting the input layer and connected to all of the neurons of the intermediate layer, whereas the outputs of the respective neurons for the intermediate layer are connected to all of the neurons of the output layer. At this time, values obtained by multiplying the outputs from the respective neurons of the input layer and intermediate layer by weight (coupling) coefficients $K_{11}$ to $k_{86}$ ($-\infty$ to $+\infty$) are inputted to the respective neurons of both the intermediate layer and output layer. For instant, a value "$U_{n21}$" to be inputted to the neuron $n_{21}$ of the intermediate layer is calculated based on the following equations (5):

$$U_{n21} = \sum_{i=1}^{12} V_{nli} K_{li} \quad (5)$$

where symbol $V_{nli}$ indicates the outputs (0 to 1) of the neurons $n_{11}$ to $n_{112}$ for the input layer.

Then, this value $U_{n21}$ is substituted for the following equation (6), and thus the resultant values of 37 0" to "1" are inputted to the respective neurons $n_{31}$ to $n_{32}$ for the output layer as an output $V_{n21}$ of this neuron $n_{21}$. In the output layer, output values of the neurons $n_{31}$ and $n_{32}$ are obtained in the similar manner to that of the above-described neuron $n_{21}$.

$$V_{n21} = \frac{1}{1 + e^{-U_{n12}}} \quad (6)$$

Based on these outputs $V_{n31}$ and $V_{n32}$, the number of waiting passengers "Nm" is calculated in accordance with the below-mentioned equation (7) and then is outputted:

$$Nm = 100 \cdot V_{n31} + 10 \cdot V_{n32} \quad (7)$$

As a result, in the case when, for example, $V_{n31} = 0.1$ and $V_{n32} = 0.2$, the number of waiting passengers Nm is given by:

$$Nm = 10 + 2 = 12 \text{ (passengers)}.$$

That is to say, the neuron $n_{31}$ denotes the 10th order whereas the neuron $n_{32}$ indicates 1st order in this preferred embodiment.

The resultant value is transferred by the transfer processing unit 3313 to the image supervising apparatus 23 and also the teacher information generating means 15 employed therein (image processing unit 236 shown in FIG. 4). Also, this value is transferred via the image supervising apparatus 23 to the group managing control apparatus 20.

Figure 16:
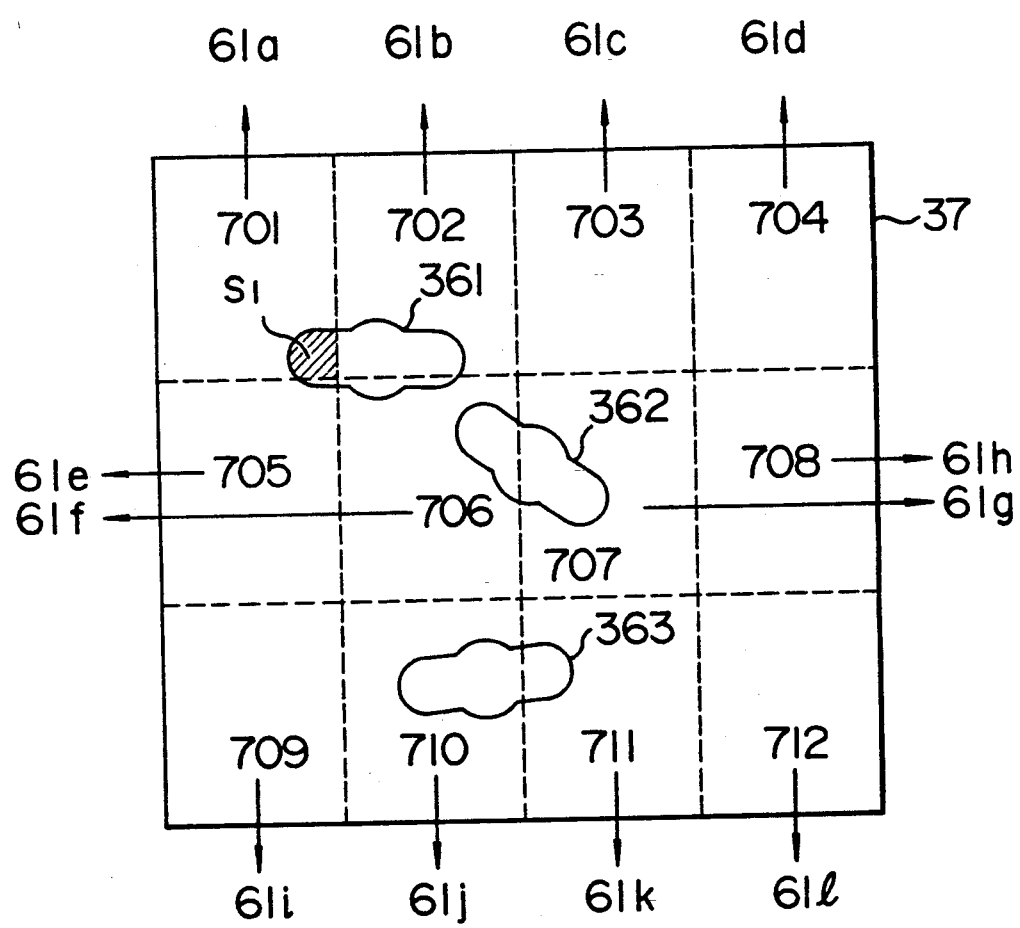
FIG. 16 is an explanatory diagram for representing an image process by way of the neural network.

As the input data 61a to 61l entered into the image processing unit 3312, various sorts of featured amounts extracted from the image may be employed, or the data related to the pixels of the image may be directly employed. As represented in FIG. 16, for instance, a screen 37 may be subdivided into 12 blocks 701 to 712, and an area of an object obtained in each block may be normalized based on the following equation (8) so as to obtain the normalized value which will be utilized:

$$V_a = \frac{S_1}{N \cdot M/12} \quad (8)$$

where,

Va: value of input data 61a,

N: total number of pixel in the horizontal direction (256),

M: total number of pixel in the vertical direction (240), and $S_1$: area of object within block 701 (pixel quantity).

In this preferred embodiment, when the adjustments for weight (coupling) coefficients $K_{11}$ to $K_{86}$ are performed by the teacher information, the method for learning the generally known neural network may be employed. In other words, the back propagation method is utilized in which the teacher information is inputted to the neurons $n_{31}$ to $n_{32}$ of the output layer in the reverse direction and the inputted teacher information is propagated from the intermediate layer to the input layer so as to adjust each of these coefficients. Since this back propagation method is known from the above-described publication 3 and the like, no further explanation thereof is made in the specification.

The teacher information generating means 15 employed in the image supervising apparatus 23 is periodically triggered by a timer 56, so that periodic learning effected by the timer interruption is performed.

According to this preferred embodiment, since the image processing unit is arranged by the neural networks, the number of waiting passengers may be detected at high speeds and furthermore, the proper weight coefficients may be automatically obtained by way of the back propergation method. In particular, if the learning is periodically executed based on the teacher information, the pattern recognition effects may be expected and also such an image processing apparatus capable of following variations in the surrounding environment may be realized.

Now, one example of a method for producing the above-described background image g(x,y) will be explained with reference to FIGS. 17 and 18.

Figure 17:
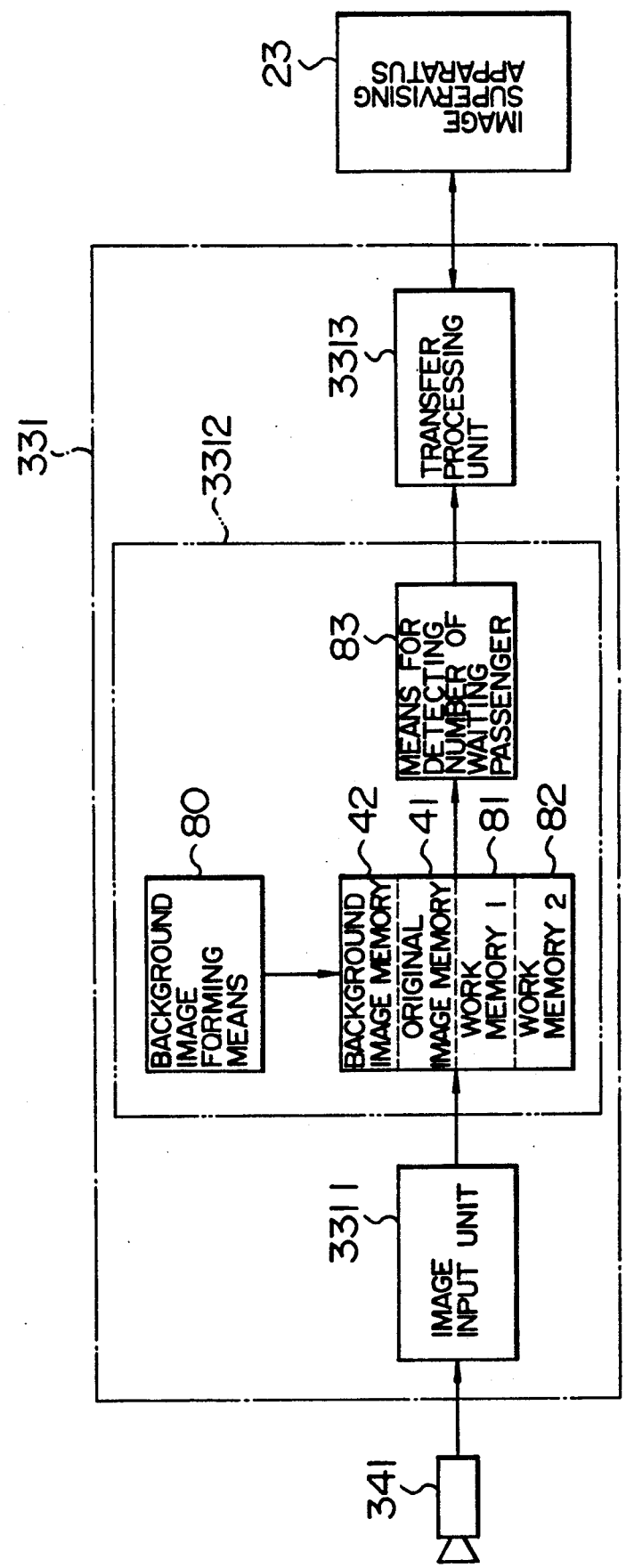
FIG. 17 is a detailed block diagram of an image processing apparatus 331 according one preferred embodiment.

In FIG. 17, the above-described image processing unit 3312 is arranged by memories 41, 42, 81 and 82, and a background image forming means 80 and furthermore a means 83 for detecting the number of waiting visitors. The background image g(x,y) is produced by the background image forming means 80.

The forming process of the background image by the background image forming means 80 will now be explained with reference to a flowchart shown in FIG. 18.

In accordance with the present invention, the background image forming means 80 produces the background image based upon the process results of 5 continuous screens. As a consequence, the background image forming means 80 is equipped with flag tables BGT+0 to +4 corresponding to the five continuous screens.

(1). After a background image production is commenced, the background image forming means 80 sets an initial value "FF" to these flag tables BGT+0 to +4 which correspond to the respective five screens (a step 500).

(2). Next, the first screen is fetched to be stored into the memory 42 used for storing background images, and also this image is stored into the work memory 81 as a provisional background image (a step 501).

(3). Subsequently, the subsequent image is fetched so as to be stored in the memory 41 for storing original images as an original image, and then a difference between the provisional background image and the original image is obtained in the similar manner to that of the above-described detection for the number of waiting passengers, whereby the binary coding operation is performed (steps 502 to 504).

(4). Based on the result obtained at the step 504, an area "SO" of white is calculated, and also a judgement is made whether or not the calculated area "SO" is greater than a predetermined threshold value "SH" (steps 505 and 506).

(5). If the judgement result at the step 506 is true, it is understood that there is a difference between the first image and the succeeding image larger than a predetermined value. Then, "1" is set to the above-described flag table "BGT+n", i.e., the flag table BGT+0 in this case, and also the original image which has been stored in the memory 41 is transferred to the work memory 82 as a provisional image (steps 507 and 508).

(6). On the other hand, if the judgement result at the previous step 506 becomes false, then it is understood that there is substantially no difference between the first image and the subsequent image, and "0" is set to the flag table BGT+n, i.e., the flag table BGT+0 in this case (step 509).

(7). Thereafter, the process operations as defined from the step 502 to the step 509 are repeatedly performed until it is judged n=5, namely the process operations for 5 screens have been accomplished (step 510).

(8). Next, a summation $S_1$ of the flag tables BGT+0 to +4 is calculated, and a check is made whether or not this summation $S_1$ is equal to 0, namely $S_1 \neq 0$ (steps 511 and 512).

(9). In the case when the judgement result at the step 512 is false, namely $S_1 = 0$, since the 5 continuous screens are substantially identical to each other, the present provisional background image is understood as the real background image and this process operation is ended. In this case, since there is no change in the images, as indicated by a dot line in FIG. 18, the process operation may be accomplished without executing modification of the real background image (step 515).

(10). If the judgement result at the step 512 is true, namely $S_1 \neq 0$, a judgement is made whether or not $S_1 = 1$. If the judgement result is true, i.e., $S_1 = 1$, then a further check is made whether or not the flag table BGT+0=1. If this judgement result is also true, it implies that the screen having any changes corresponds to only the original image which has been first processed, and also the remaining 4 images are stable. Accordingly, the provisional background image stored in the work memory 82 is transferred to the memory 42 for storing the background images as the real background image, so that the process for forming background images is completed (steps 513 to 515).

(11). If the judgement result at the step 513 is false, namely it is conceivable that the screen is not stable and a visitor is present, the process is returned to the step 500 in such a case that the judgement result at the step 514 is false, i.e., it may be supposed that variations of images happen to occur in the five screens and further other changes happen to occur in screens after a sixth screen. Thus, the above-described process operation is repeated.

In accordance with the above-described background image forming method, such a judgement is made that since no change is present in the 5 images successively fetched, therefore there is no person moving within the fetched images, namely no passenger waits for the elevator. The image fetched at this stage may be utilized as the background image. The number of compared images is not equal to 5, but may be selected to be other numbers.

Figure 19:
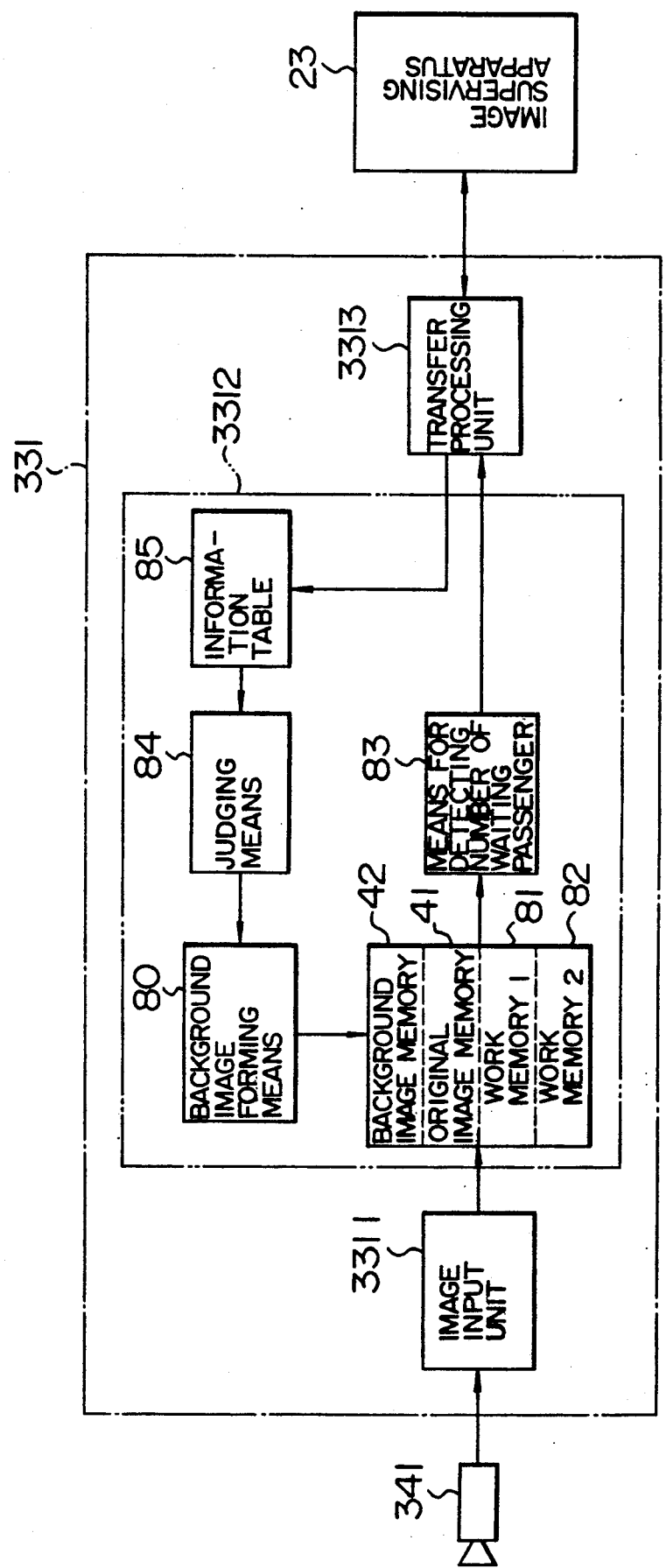
FIG. 19 is a schematic block diagram of an image processing apparatus according to another preferred embodiment; and, FIGS. 20 and 21 are flowchart for explaining an image processing operation of the image processing apparatus shown in FIG. 19.

Also, the image processing apparatus 331 can surely produce the background image g(x,y) under such a condition that no passenger waits for the elevator by executing the above-described background image forming process based on the elevator information. In this case, this image processing unit 3312 may be arranged as shown in FIG. 19. This image processing unit 3312 may be arranged based on the arrangement as described in the previous embodiment in FIG. 17 by additionally employing an information table 85 for storing information which has been transferred from the image supervising apparatus 23, and also a judging means 84 for judging the background image produce timing based on this information.

Therefore, only different arrangements from those shown in FIG. 17 will now be made.

The image processing apparatus 331 shown in FIG. 19 periodically receives from the image supervising apparatus 23, the elevator information such as car positioning information. The above-described information is stored in the information table 85. The judging means 84 judges the timing of no passenger who is waiting for the elevator at the hall based on the memory contents of the table 85. If no passenger waits for the elevator, then the judging means 84 outputs "1" and instructs the background image forming means 80 to allow the formation of the background image.

Figure 18:
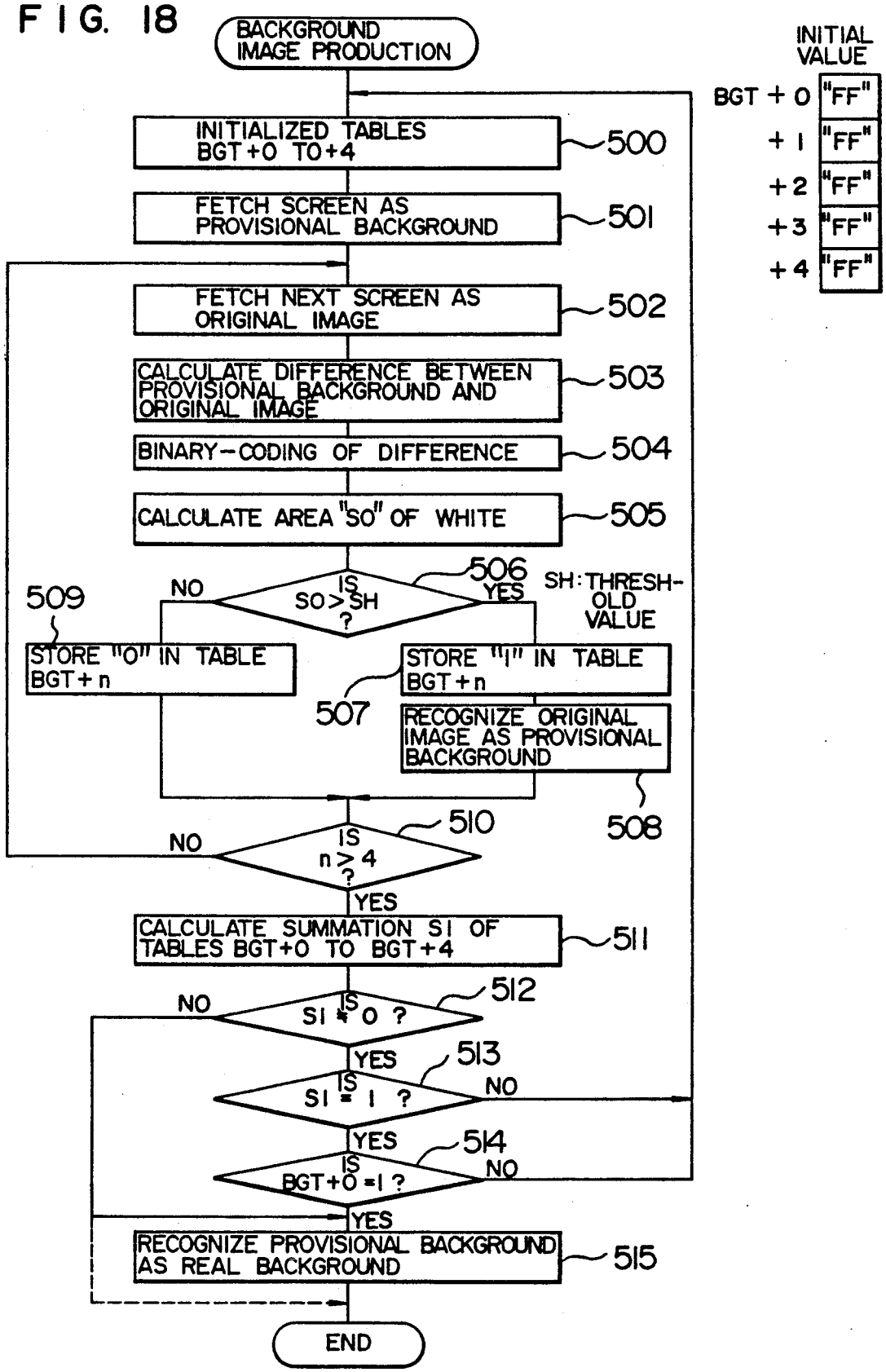
FIG. 18 is a flowchart for explaining an image processing operation of the image processing apparatus 331.

In response to this instruction, the background image forming means 80 forms the background image, the forming process of which is similar to that of FIG. 18.

Figure 20:
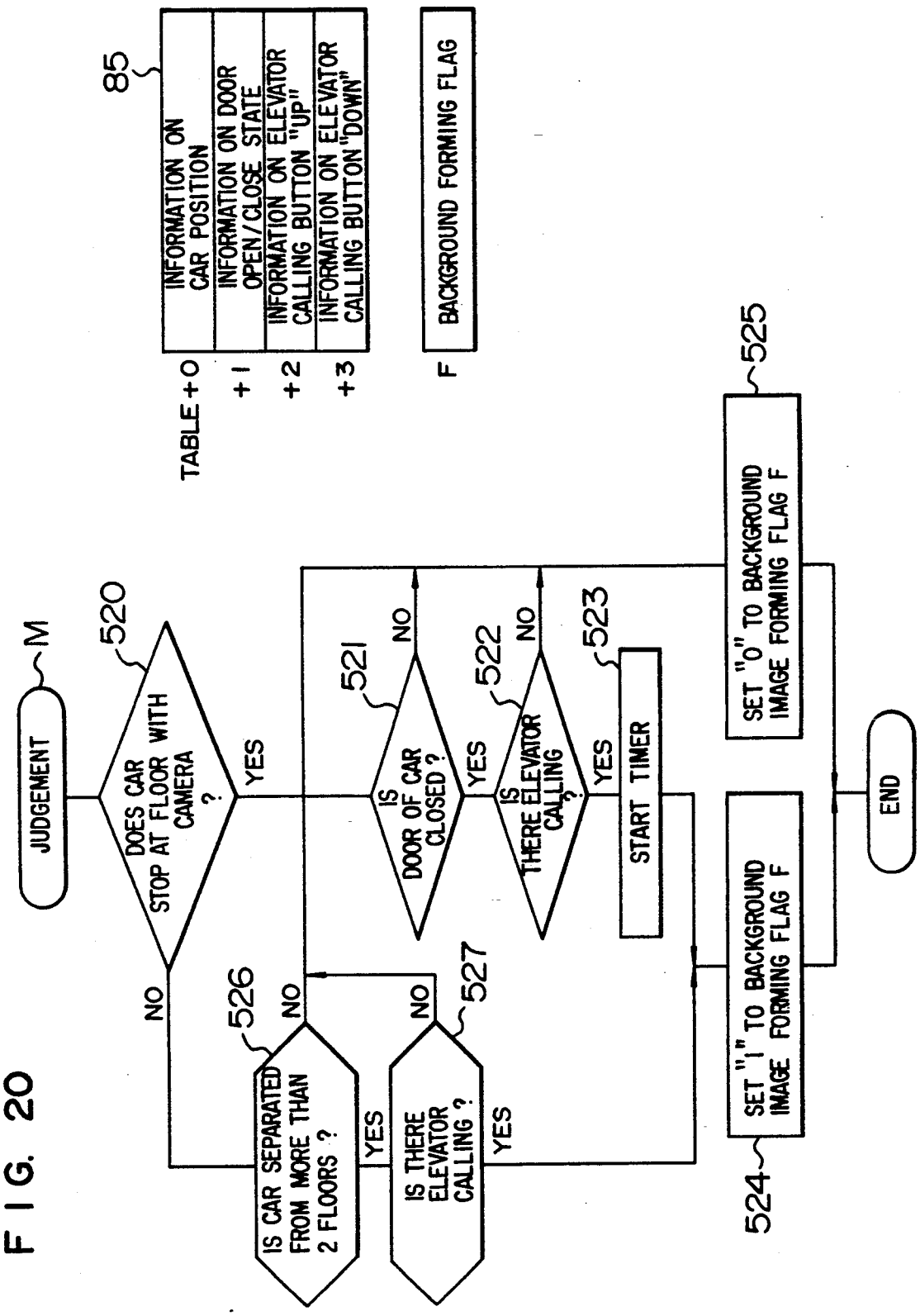

Then, operations of the judging means 84 will now be described with reference to a flowchart shown in FIG. 20. In FIG. 20, there are also shown the contents of the information table 85 which stores therein the information transferred from the image supervising apparatus. In this information table 85, car position information is stored at an address of TABLE+0; door open/close information is stored at an address of +1; and information about UP/DOWN callings is stored at addresses of +2 and +3.

(1). With reference to the contents of the information table 85, the judging means 84 first judges whether or not the car stops at the floor where a camera 341 has been installed (a step 520).

(2). If the judgement result at the step 520 is true, in other words, the car stops at the floor where the camera 341 has been installed, checks are made whether or not the door of this car is closed, and also whether or not the elevator calling is made (steps 521 and 522).

(3) In the case when both of the judgement results at the step 521 and 522 are true, it may be judged that "all of waiting passengers at the hall have been ridden on the elevator and thus no waiting passenger is present at the hall". After a predetermined time period has passed, "1" is set to a background image forming flag "F" shown in FIG. 20 (steps 523 and 524).

(4). On the other hand, in the case when the judgement result of either the step 521 or 522 is false, it may be judged that "all of the passengers waiting for the elevator at the hall are riding on the elevator, or could not ride thereon". Accordingly, since a judgement is made that there are passengers at the hall, "0" is set to the above-described background image forming flag "F". This background image forming flag "F" becomes an output of the judging means 84 (step 525).

(5). If the judgement result of the above-described step 520 is false, namely the car does not stop at the floor where the camera 341 is mounted, further judgements are made whether or not the position of the car is separated from more than 2 floors, and also whether or not the calling is made at the floor (steps 526 and 527).

(6). When the judgement results at the steps 526 and 527 are true (YES), it may be judged that "no passenger waiting for the elevator is present at the hall, and this elevator does not come to this floor for the time being", so that "1" is set to the above-described background image forming flag F (step 524).

(7). In the case when the judgement result of either the step 526 or 527 is false, it may be judged that "the elevator is positioned at another floor separated from this floor by 1 floor, and therefor will arrive soon at this floor, otherwise no passenger is present at the hall", and thus "0" is set to the background image forming flag "F" (step 525).

In the process operation of the above-described judging means 84, a step to judge whether or not the car is departing from this floor may be interposed before or after the previous steps 526 and 527 With this additional step, it may be judged whether or not the background image formation is further precisely instructed.

In accordance with the above-described process operation, the instruction signal (content of background image forming flag "F") outputted from the judging means 84 is supplied to the background image forming means 80 which will perform the background forming process in case that the above-described output is equal to "1".

Figure 21:
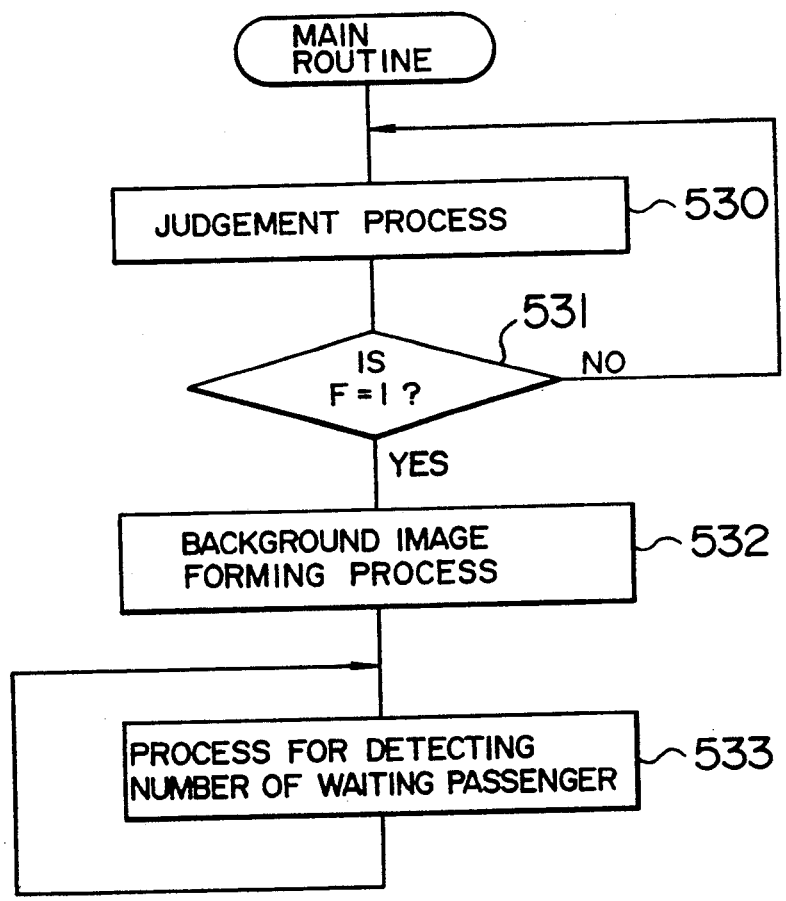

Subsequently, a series of processing operation by the image processing unit 3312 shown in FIG. 19 will now be explained with reference to a flowchart shown in FIG. 21.

(1). First, the judgement process as explained in FIG. 20 is executed, another judgement is made whether or not F=1 with respect to the content of the background image forming flag "F" which is set by receiving the above-described judgement result. A judgement is made whether or not there is no passenger in the hall during the judging process (steps 530 and 531).

At the step 531, if it is judged that F=1, then a judgement is made that no waiting passenger is present at the hall. Accordingly, the background image forming means 80 performs the background image forming process as described with reference to FIG. 18, and stores the background image functioning as a reference into the memory 41 (step 532).

(3). Subsequently, the waiting passenger detecting means 83 repeatedly executes the image processing sequence as explained with reference to FIG. 7 (step 533).

(4). On the other hand, if F=0 at the previous step 531, then the process operation as defined at the step 530 is repeatedly performed so as to detect the timing at which F=1.

In accordance with the above-described this preferred embodiment of the present invention, a detection is made of the timing at which no waiting passenger is present, whereby the background image can be surely formed.

Furthermore, the background image may be updated even when the background is changed due to variations in the lighting conditions by executing both the judging process and the background image forming operation before and after the process to detect the waiting passengers.

According to the above-explained background image forming method, the image processing apparatus may produce the background image under such a condition that no waiting passenger is present at an arbitrary time instant, and thus may correctly detect the number of waiting passenger by employing this formed background image.

The present invention may be widely utilized not only in the above-described system for detecting the passengers who wait for the elevators at the elevator halls, but also in a system for recognizing characters written on license plates, or number plates for automobiles, otherwise a system for detecting confusion conditions of exhibitions and the like.

According to the present invention, since the teacher information generating means is employed with respect to the image processing results which aim at not previously set pattern, but the real images to be processed, either the processing program required for processing the images, or the parameters (for instance, various threshold values or weighting coefficients) used for this processing program may be corrected in accordance with the conditions of the objects to be image- processed. As a result, for instance, it may be constructed such that the detecting precision of the image processing system set under the actual operating condition is improved in a online mode.

What is claimed is:

1. An image processing apparatus wherein image information is inputted to image processing means which performs an image processing on said image information based on a predetermined image processing algorithm, comprising:
    means for generating teacher information related to a result of said image processing from said image processing means; and
    means for correcting either said image processing algorithm, or a parameter thereof based upon said teacher information;
    wherein said image processing means includes means, supplied with said image information, for performing an image processing to recognize the number of an object, and said teacher information generating means includes means for detecting a weighted value of said object, and means for computing teacher information related to the number of an object based on the detected weighted value.

2. An image processing apparatus as claimed in claim 1, wherein said teacher information generating means is supplied with image information identical to the image to be processed in said image processing means and includes means for executing an image processing with higher precision than that of said image processing means.

3. An image processing apparatus according to claim 1
    wherein said teacher information generating means generates said teacher information related to an image processing result from said image processing means with a delay, as compared with said image processing performed by said image processing means.

4. An image processing apparatus according to claim 1
    wherein said teacher information generating means produces teacher information related to an output of said image processing means by performing a different image processing than that in said image processing means.

5. An image processing apparatus according to claim 27
    wherein said teacher information generating means includes means for judging a condition related to an image object to be processed; and
    said correcting means includes means for correcting either said image processing algorithm, or a parameter thereof in response to an output from said judging means.

6. An image processing apparatus as claimed in claim 1, wherein said correcting means includes means for selecting either a plurality of algorithms or the parameters thereof which have been previously prepared.

7. An image processing apparatus according to claim 1
    wherein said correcting means includes means for determining a correcting amount with respect to an adjusting parameter of said image processing algorithm based upon the teacher information.

8. An image processing apparatus as claimed in claim 5, wherein said image processing means includes background image forming means; and said background image forming means successively compares two adjoining images of image information which are inputted in a time sequential mode with each other, and determines one image as a background image in case that variations in the images are below than a certain threshold value with respect to a predetermined continuous comparison number.

9. An image processing apparatus according to claim 1 further comprising:
    a plurality of said image processing means for receiving image information different from each other;
    wherein said teacher information generating means is commonly provided with said plurality of image processing means, for selectively producing teacher information related to image-processed results from said plurality of image processing means; and
    wherein said correcting means, based on the teacher information, corrects either an image processing algorithm or a parameter thereof of each of said plurality of image processing means corresponding to the teacher information.

10. An image processing apparatus as claimed in claim 9, wherein said teacher information generating means includes second image processing means capable of selectively inputting said image information different with each other.

11. An image processing apparatus according to claim 1, further comprising:
    said image processing means being a neural network having multiple layers; and
    leaning means for correcting a weight coefficient of said neural network based upon said teacher information.

12. An image processing apparatus as claimed in claim 11, further comprising:
    means for periodically initiating said learning means.

13. An image processing apparatus as claimed in claim 7, wherein said image processing means includes background image forming means; and said background image forming means successively compares two adjoining images of image information which are inputted in a time sequential mode with each other, and determines one image as a background image in case that variations in the images are below than a certain threshold value with respect to a predetermined continuous comparison number.

14. An image processing apparatus as claimed in claim 1, wherein the image processing means includes background image forming means; and said background image forming means successively compares two adjoining images of image information which are inputted in a time sequential mode with each other, and determines one image as a background image in case that variations in the images are below than a certain threshold value with respect to a predetermined continuous comparison number.

15. An image processing apparatus as claimed in claim 3, wherein said image processing means includes background image forming means; and said background image forming means successively compares two adjoining images of image information which are inputted in a time sequential mode with each other, and determines one image as a background image in case that variations in the images are below than a certain threshold value with respect to a predetermined continuous comparison number.

16. A group-supervised elevator controlling apparatus as claimed in claim 8, wherein said first image processing means includes background image forming means; and said background image forming means successively compares two adjoining images of image information which are inputted in a time sequential mode with each other, and determines one image as a background image in case that variations in the images are below than a certain threshold value with respect to a predetermined continuous comparison number.

17. A group-supervised elevator controlling apparatus comprising:
   a plurality of elevator cars for providing service to multiple floors;
   destination calling means provided within said plural cars;
   elevator control means for stopping the car at the floor corresponding to at least said elevator calling;
   hall calling means provided at each of floors;
   group supervising control means for determining the served car in response to at least the hall calling;
   a plurality of photographing means provided at arbitrary floors for outputting image information;
   first image processing means, provided with the corresponding floors, for selectively inputting said image information and recognizing the number of waiting passengers at the floors by performing a first image processing on said image information based on a first image processing algorithm;
   means for transferring outputs of said first image processing means to said group supervising control means;
   second image processing means for selectively inputting said image information and recognizing the number of waiting passengers at the relevant floors by performing a second image processing on said image information based on a second image processing algorithm different from said first image processing algorithm; and
   means for correcting either said first image processing algorithm, a parameter thereof for said first image processing means based upon an output from said second image processing means.

18. A group-supervised elevator controlling apparatus according to claim 17
   wherein said second image processing includes means for detecting a weighted value of a passenger; and
   wherein said correcting means includes means for correcting either said first image processing algorithm or a parameter thereof based on the detected weighted value.

19. A group-supervised elevator controlling apparatus according to claim 17 wherein said second image processing means comprises:
   means for generating teacher information related to an image-processed result from said image processing means, and
   means for judging a condition related to an object to be image-processed; and
   wherein said correcting means includes means for correcting either said image processing algorithm or a parameter thereof based on said teacher information and an output from said condition judging means.

20. A group-supervised elevator controlling apparatus according to claim 17 further comprising:
   said second image processing means including means for generating teacher information related to said result of said image processing from said first image processing means;
   means for inputting both the result of said image processing from said first image processing means and the information from said group supervising control means so as to produce an initiation instruction to said teacher information generating means; and
   said correcting means including means for correcting said image processing algorithm or a parameter thereof based on the teacher information.

21. A group-supervised elevator controlling apparatus as claimed in claim 19, wherein said first image processing means includes background image forming means; and said background image forming means successively compares two adjoining images of image information which are inputted in a time sequential mode with each other, and determines one image as a background image in case that variations in the images are below than a certain threshold value with respect to a predetermined continuous comparison number.

22. A group-supervised elevator controlling apparatus as claimed in claim 20, wherein said first image processing means includes background image forming means; and said background image forming means successively compares two adjoining images of image information which are inputted in a time sequential mode with each other, and determines one image as a background image in case that variations in the images re below than a certain athreshold value with respect to a predetermined continuous comparison number.

23. A group-supervised elevator controlling apparatus as claimed in claim 17, wherein at least one of said first image processing means and second image processing means includes:
   judging means for judging whether or not a waiting passenger is present at an elevator hall based on elevator information derived from either the group supervising control means, or the elevator control means; and background image forming means for forming a background image in response to an output from said judging means.

24. A group-supervised elevator controlling apparatus as claimed in claim 17, wherein said background image forming means fetches a plurality of hall images in a time sequential mode, successively compares two adjoining hall images with each other, and also determines one hall image as a background image in case that variations in the hall images is below than a certain threshold value with respect to a predetermined continuous comparison number.

25. A group-supervised elevator controlling apparatus as claimed in claim 17, wherein the elevator information corresponds to at least one of a state where a door of an elevator is opened/closed at the hall entrance, hall calling information, and also car position information.

26. An image processing apparatus as claimed in claim 24, wherein the elevator information corresponds to at least one of a state where a door of an elevator is opened/closed at the hall entrance, hall calling information, and also car position information.

27. An image processing apparatus wherein image information is inputted to first image processing means which performs an image processing on said image information based on a predetermined image processing algorithm, comprising:
means for generating teacher information related to a result of said image processing from said image processing means; and
means for correcting either said image processing algorithm, or a parameter thereof based upon said teacher information;

a plurality of elevator cars for providing service to multiple floors;
destination calling means provided within said plural cars;
elevator control means for stopping the car at the floor corresponding to at least said elevator calling;
hall calling means provided at each of floors;
group supervising control means for determining the served car in response to at least the hall calling;
a plurality of photographing means provided at arbitrary floors for outputting image information;
said first image processing means being provided with the corresponding floors, for selectively inputting said image information and recognizing the number of waiting passengers on the floors by performing a first image processing on said image information based on a first image process algorithm;
means for transferring outputs of said first image processing means to said group supervising control means;
said teacher information generating means being second image processing means for selectively inputting said image information and recognizing the number of waiting passengers at the relevant floors by performing a second image processing on said image information based on a second image processing algorithm different from said first image processing algorithm; and
said means for correcting corrects either said first image processing algorithm, or a parameter thereof for said first image processing means based upon an output from said second image processing means.

28. A group-supervised elevator controlling apparatus as claimed in claim 17, wherein said correcting means includes means for selecting either a plurality of algorithms or the parameters thereof which have bene previously prepared.

* * * * *